US00RE43076E

(19) United States
(12) Reissued Patent
Okamura

(10) Patent Number: US RE43,076 E
(45) Date of Reissued Patent: Jan. 10, 2012

(54) WAVEFORM PROCESSING APPARATUS WITH VERSATILE DATA BUS

(75) Inventor: Kazuhisa Okamura, Hamamatsu (JP)

(73) Assignee: Yamaha Corporation, Hamamatsu-shi (JP)

(21) Appl. No.: 12/959,249

(22) Filed: Dec. 2, 2010

Related U.S. Patent Documents

Reissue of:
(64) Patent No.: 7,459,625
Issued: Dec. 2, 2008
Appl. No.: 11/450,162
Filed: Jun. 6, 2006

U.S. Applications:
(62) Division of application No. 10/655,386, filed on Sep. 4, 2003, now Pat. No. 7,220,908.

(30) Foreign Application Priority Data

Sep. 12, 2002 (JP) ..... 2002-266848
Sep. 12, 2002 (JP) ..... 2002-266860
Sep. 12, 2002 (JP) ..... 2002-266878

(51) Int. Cl.
*G01H 7/00* (2006.01)
(52) U.S. Cl. ..... 84/603; 365/230.03
(58) Field of Classification Search ..... 84/603
See application file for complete search history.

(56) References Cited

U.S. PATENT DOCUMENTS 4,412,470 A * 11/1983 Jones ..... 84/645
5,121,667 A * 6/1992 Emery et al. ..... 84/603
5,614,685 A * 3/1997 Matsumoto et al. ..... 84/602
5,949,011 A * 9/1999 Ichiki ..... 84/602
6,088,364 A * 7/2000 Tokuhiro ..... 370/466
6,189,060 B1 * 2/2001 Kodama ..... 710/108
6,226,697 B1 * 5/2001 Tokuhiro ..... 710/36
6,279,057 B1 * 8/2001 Westby ..... 710/52
6,291,757 B1 * 9/2001 Yamanoue ..... 84/615
6,401,228 B1 * 6/2002 Ichikawa et al. ..... 714/755
6,643,674 B2 * 11/2003 Kamiya et al. ..... 708/300
6,700,050 B2 * 3/2004 Sakurada et al. ..... 84/615
6,775,246 B1 * 8/2004 Kuribayashi et al. ..... 370/257
2002/0080783 A1 * 6/2002 Fujimori ..... 370/384

FOREIGN PATENT DOCUMENTS

JP 04-249933 9/1992
JP 05-188967 7/1993
JP 07-226754 8/1995
JP 11-202864 7/1999
JP 11-202868 7/1999
JP 2001-094627 4/2001
JP 2002-251183 9/2002

* cited by examiner

*Primary Examiner* — Jianchun Qin
(74) *Attorney, Agent, or Firm* — Morrison & Foerster LLP

(57) ABSTRACT

A waveform data processing apparatus has a bus that transfers data signals representative of waveform data. A plurality of transmitting nodes transmit the data signals to the bus. A plurality of receiving nodes receive the data signals from the bus. A clock generator generates a word clock signal at each sampling period. A controller is responsive to the word clock signal for conducting a session of transferring the data signals within a sampling period, such that the transmitting nodes sequentially transmit the data signals in an order predetermined by the controller so as to avoid collision of the data signals within the sampling period, and each of the receiving nodes selectively admits a necessary one of the data signals outputted from the transmitting nodes and processes the admitted data signal within the sampling period.

8 Claims, 16 Drawing Sheets

WAVEFORM PROCESSING APPARATUS WITH VERSATILE DATA BUS

Matter enclosed in heavy brackets [ ] appears in the original patent but forms no part of this reissue specification; matter printed in italics indicates the additions made by reissue.

CROSS REFERENCE TO RELATED APPLICATION

This application is a division of application Ser. No. 10/655,386 (now U.S. Pat. No. 7,220,908), filed on Sep. 4, 2003, the entire contents of which are incorporated herein by reference.

BACKGROUND OF THE INVENTION

1. Technical Field of the Invention

The present invention relates to a waveform data processing apparatus with a dedicated data bus suitably used for connection among musical sound processing devices.

2. Prior Art

A sound board mounted on an electronic musical instrument, personal computer or the like is equipped with a plurality of LSIs which processes musical sound signals, and these LSIs are connected by connection lines for transmitting and receiving the musical sound signals, thereby enabling necessary functions. Here, an example of the sound board mounted on the electronic musical instrument is shown in FIG. 1(a). In the drawing, 100 denotes a sound board, on which sound generator LSIs 102, 104 are mounted. The sound generator LSIs 102, 104 comprise, for example, waveform synthesizing sections which generate musical sound signals of a plurality of channels, and mixers which mix the musical sound signals of a plurality of channels as necessary. Further, 106, 108 denote DSPs (digital signal processors), which apply various kinds of effect processing to the generated musical sound signals.

The musical sound signals which have been applied the effect processing are again supplied to the sound generator LSIs 102, 104. In addition, the sound generator LSIs 102, 104 also exchange musical sound signals between them. Then, the musical sound signals to be finally output are supplied from the sound generator LSI 104 to a DA converter 110 where they are converted into analog signals. 114 denotes a plug-in board which can be added optionally and is equipped with an additional waveform synthesizing section, DSP or the like. This plug-in board 114 is plugged into a connector 112 as necessary.

Furthermore, another configuration of the sound board is shown in FIG. 1(b). In the drawing, 120 denotes another sound board, and sound generator LSIs 122, 124 inside therein each synthesize musical sound signals of a plurality of channels. The synthesized musical sound signals are mixed by mixers in the sound generator LSIs 122, 124, and the musical sound signals, which result from the mixing, are supplied to DSPs 126, 128. The DSPs 126, 128 apply effect processing to the supplied musical sound signals. Here, the musical sound signals to which the effect processing is applied by the DSP 126 are supplied to the DSP 128. When a plug-in board 134 is plugged into a connector 132, musical sound signals generated by this plug-in board 134 are also supplied to the DSP 128. These digital signals are further mixed in the DSP 128, and results of the mixing are converted to analog signals by a DA converter 130.

In the examples of FIGS. 1(a) and 1(b), even if the sound generator LSIs and DSPs used in the sound boards 100, 120 are completely common parts, they are connected in different states, so that the sound boards 100, 120 themselves are not compatible. In other words, hardware components must be designed and produced for each kind of sound board, depending on the function that the sound board is designed to carry out.

On the other hand, a technique is known in which a hardware common connection state is shared by a plurality of nodes, while a exchanging state of signals is set depending on the function that will finally be needed, thereby setting a logical connection relationship. For example, the applicant has proposed a network standard called mLAN (trademark) wherein an electronic musical instrument or equipment such as a synthesizer or digital mixer, and a computer or the like are connected by serial cables on an IEEE1394 interface, thereby exchanging musical sound signals or music performance information.

In addition, Japanese Patent Publication Laid-open No. 5-188967 discloses a technique in which an AD converter, hard disk and a waveform memory are connected on a common bus, and waveform data or the like is exchanged among these nodes on a time-divisional basis.

As described above, in the examples of FIGS. 1(a) and 1(b), hardware components must be designed and produced for each kind of sound board because the sound boards 100, 120 are not compatible, thus increasing designing costs and making it difficult to lower costs by mass production. Therefore, it is preferable, for example, that sound generator LSIs 142, 144, DSPs 146, 148, a DA converter 150 and a plug-in board 154 (via a connector 152) can be connected on a common bus 156, as shown in FIG. 1(c). That is, if the physical hardware connection relationship is common while logical connection relation can be set as required at the same time, the sound board in FIG. 1(c) can carry out functions equivalent to the sound boards shown in FIG. 1(a) or 1(b), for example.

In this case, it is important that a suitable kind of standard is employed to connect the LSIs to the bus 156. The mLAN™ mentioned above is based on the assumption that independent equipment such as the synthesizer or digital mixer is to be the node, so that signal compositions are complicated and it is impracticable to adapt individual LSIs to the mLAN standards. Moreover, the technique disclosed in Japanese Patent Publication Laid-open No. 5-188967 allows the specific nodes that are shown in this publication to exchange waveform data or the like, but can not be adapted to various kinds of nodes in a general and multi-purpose manner.

SUMMARY OF THE INVENTION

This invention has been attained in view of the circumstances described above, and is intended to provide a waveform data processing apparatus capable of securing high versatility with a simple circuit.

In order to solve the problems mentioned above, the present invention is characterized by comprising the following constitution. It should be noted that references in parentheses are examples.

A waveform data processing apparatus according to a first aspect of the invention comprises: a bus (A bus 262) that transfers data signals (ADAT) of waveform data; a plurality of transmitting nodes (15, 16, 17) that transmits the data signals to the bus; a plurality of receiving nodes (15, 16, 17) that receives the data signals from the bus; and a clock generator (251) that generates a word clock signal (WCK) per sampling period, and the waveform data processing apparatus is characterized in that each of the transmitting nodes transmits the data signals to the bus per the sampling period in predetermined order, and each of the receiving nodes selectively acquires a necessary signal from the data signals output from each of the transmitting nodes and processes the acquired data signal per the sampling period.

Furthermore, according to the constitution set forth in FIG. 2, the inventive waveform data processing apparatus is characterized in that the plurality of transmitting nodes and receiving nodes each operates on the basis of an independent operation clock signal (system clock signal); the plurality of transmitting nodes generates a sync clock signal (ACLK) on the basis of the operation clock signals of the transmitting nodes, and outputs the sync clock signal to the bus (262) together with the data signals; and the plurality of receiving nodes takes the data signals and the sync clock signal from the bus (262), and converts the data signals taken from the bus into data signals synchronous with the operation clock signals of the receiving nodes on the basis of the sync clock signal and the operation clock signals of the receiving nodes.

Furthermore, according to the constitution set forth in FIG. 3, the inventive waveform data processing apparatus is characterized in that the data signals are waveform data having an m ("32")-bit width; the plurality of transmitting nodes divides the waveform data having the m-bit width into partial data having an n ("4" or "16")-bit width, which is an independent bit width for each of the transmitting nodes, to transmit the partial data to the bus; and the receiving nodes selectively receive m/n words of partial data corresponding to one unit of waveform data from the bus, and restore the m-bit waveform data from the m/n words of partial data so as to acquire the one unit of waveform data.

Furthermore, another waveform data processing apparatus according to the first aspect of the invention comprises: a bus (A bus 262) that transfers data signals of waveform data; at least one transmitting node (15, 16, 17) that transmits the data signals to the bus; and at least one receiving node (15, 16, 17) that receives the data signals from the bus, and the waveform data processing apparatus is characterized in that the transmitting node operates on the basis of a first operation clock signal (system clock signal) and generates a sync clock signal (ACLK) on the basis of the first operation clock signal, and outputs the sync clock signal and a first data signal synchronous with the sync clock signal to the bus; and the receiving node operates on the basis of a second operation clock signal (system clock signal), receives the sync clock signal and the first data signal per sampling period, and converts the received first data signal into a second data signal synchronous with the second operation clock signal.

Furthermore, a still another waveform data processing apparatus according to the first aspect of the invention comprises: a bus (A bus 262) that transfers data signals (ADAT) of waveform data; a plurality of transmitting nodes (15, 16, 17) that transmits the data signals to the bus; a plurality of receiving nodes (15, 16, 17) that receives the data signals from the bus; and a clock generator (251) that generates a word clock signal (WCK) per sampling period, and the waveform data processing apparatus is characterized in that each of the transmitting nodes transmits the data signals having an n ("4" or "16")-bit width, and the n-bit width can be set to different values for each transmitting node, and each of the transmitting nodes divides the waveform data having an m ("32")-bit width into m/n words of partial data per sampling period and outputs the partial data as the data signals; and each of the receiving nodes inputs the m/n words of partial data having an n-bit width per sampling period, and restores the m-bit width waveform data from the input m/n words of partial data.

Furthermore, a still another waveform data processing apparatus according to the first aspect of the invention comprises: a bus (A bus 262) that transfers data signals (ADAT) of waveform data; at least one transmitting node (15, 16, 17) that transmits the data signals related to a plurality of waveform data to the bus; and a plurality of receiving nodes (15, 16, 17) that receives the data signals from the bus; and a clock generator (251) that generates a word clock signal (WCK) per sampling period, and the waveform data processing apparatus is characterized in that the transmitting node transmits the data signals having an n ("4" or "16")-bit width, and the n-bit width can be set to different values for each unit of the waveform data, and the transmitting node divides the waveform data having an m ("32")-bit width into m/n words of partial data in accordance with the bit width n corresponding to the waveform data per sampling period, and outputs the partial data as the data signals using m/n time slots; and each of the receiving nodes selectively receives at least one unit of waveform data from the plurality of waveform data, and receives m/n words of partial data correspondingly to the bit width n of the waveform data to be received, per sampling period, and then restores the at least one unit of waveform data having an m-bit width from the received m/n words of partial data.

A waveform data processing apparatus according to a second aspect of the invention comprises: a bus (A bus 262) that transfers data signals (ADAT) of waveform data; a clock generator (251) that generates a word clock signal (WCK) per sampling period; a plurality of transmitting nodes (15, 16, 17) that transmits the data signals to the bus per frames synchronously with the word clock signal; and a plurality of receiving nodes (15, 16, 17) that receives the data signals from the bus synchronously with the word clock signal, and the waveform data processing apparatus is characterized in that each of the transmitting nodes is assigned one or a plurality of frames that are each given different frame numbers, detects a transmission frame by which each of the transmitting nodes should transmits data per sampling period, and transmits the data signal of the waveform data related to the corresponding frame to the bus; and at least one frame number by which the data is to be received is designated for each of the receiving nodes, and each of the receiving nodes detects a reception frame by which each of the receiving nodes should receive data, per sampling period, and receives the data signals of waveform data related to the corresponding frame from the bus.

Furthermore, according to the constitution set forth above, the waveform data processing apparatus is characterized in that the frame numbers given to the frames are consecutive numbers.

Furthermore, according to the constitution set forth above, the waveform data processing apparatus is characterized in that each of the transmitting nodes transmits the waveform data of a plurality of channels to the bus in each corresponding transmission frame.

Furthermore, according to the constitution set forth above, the waveform data processing apparatus is characterized in that each of the receiving nodes selectively receives the waveform data of one or a plurality of channels in each corresponding reception frame.

Furthermore, a transmitting node (15, 16, 17) transfers data of a plurality of frames on a time divisional basis per sampling period and is connected to a bus comprising a plurality of data signal lines (10) and one frame signal line (13), and thus transmits data to the bus, and the transmitting node is characterized by comprising: a frame counter (402) that counts frame numbers on the basis of frame signals (AFRM) transferred from the frame signal line (13) per sampling period; a first register (476) that stores a frame number of a transmission frame by which the transmitting node transmits data; a second register (464) that stores data to be transmitted in the transmission frame; a comparator (452) that outputs a coincidence signal when detecting that the frame number output by the frame counter corresponds to the frame number stored in the first register (476); and a transmitting section (458, 466) that forms a frame signal (AFRM) of the transmission frame and transmits the frame signal to the frame signal line (13) in response to the coincidence signal, and also transmits the data stored in the second register to the data signal line (10). Furthermore, according to the constitution set forth above, the transmitting node is characterized in that a controller for controlling the transmitting node is connected to the transmitting node, and when a plurality of transmitting nodes is connected to the bus, the controller writes different frame numbers into the first registers of the transmitting nodes.

Furthermore, according to the constitution set forth above, the transmitting node is characterized in that the second register stores data of a plurality of channels, and the transmitting section (450) sequentially outputs the waveform data of the plurality of channels to the data signal line (10) in the transmission frame.

Furthermore, a receiving node (15, 16, 17) transfers data of a plurality of frames on a time divisional basis per sampling period and is connected to a bus comprising a plurality of data signal lines (10) and one frame signal line (13), and thus receives data from the bus, and the receiving node is characterized by comprising: a frame counter (402) that counts frame numbers on the basis of frame signals (AFRM) transferred from the frame signal line (13) per sampling period; a first register (472) that stores a frame number of a reception frame by which the receiving node receives data; a second register (416) that stores data to be received by the reception frame; a comparator (408) that outputs a coincidence signal when detecting that the frame number output by the frame counter corresponds to the frame number stored in the first register (472); and a receiving section (400) that selectively takes data in the frame from the data signal line (10) into the second register in response to the coincidence signal.

Furthermore, according to the constitution set forth above, the receiving node further comprises a data counter (406) that counts the number of input data in the reception frame, and the receiving node is characterized in that data of a plurality of channels are transferred on the bus in each of the plurality of frames; the first register also stores offset values of data to be received in the reception frame; the comparator (408) outputs another coincidence signal on condition that a counting result in the data counter corresponds with an offset value stored in the first register; and the receiving section (400) selectively takes the data from the data signal line (10) into the second register depending on whether or not the counting result in the data counter corresponds with the offset value, in the reception frame.

A waveform data processing apparatus according to a third aspect of the invention comprises: a bus (262) that transfers data signals (ADAT) through a plurality of time slots on a time divisional basis per sampling period; a plurality of transmitting nodes (15, 16, 17) that transmits the data signals to the bus; at least one receiving node (15, 16, 17) that receives the data signals from the bus; and a controller (212) for setting a different transmission slot to each of the transmitting nodes, and setting a reception slot corresponding to one of the transmission slots to the receiving node, and the waveform data processing apparatus is characterized in that each of the transmitting nodes detects a time slot related to a designated transmission slot per sampling period, and supplies waveform data to the bus (262) in the detected time slot; and the receiving node detects a time slot related to a designated reception slot per sampling period, and receives the waveform data from the bus (262) in the detected time slot.

Furthermore, according to the constitution set forth above, the controller (212) detects a kind of each transmitting node connected to the bus (262), and sets the transmission slot of each transmitting node on the basis of the detection result.

Furthermore, according to the constitution set forth above, the controller (212) detects a kind of receiving node connected to the bus (262), and sets the reception slot of the receiving node on the basis of the detection result.

Furthermore, according to the constitution set forth above, the waveform data processing apparatus further comprises an instruction input section (206) that receives user instructions from a user, and the controller (212) sets a transmission slot of at least one transmitting node and a reception slot of the receiving node in accordance with the user instruction.

Furthermore, according to the constitution set forth above, the waveform data processing apparatus further comprises an instruction input section (206) that designates an operation mode in response to an instruction from a user, and the controller (212) sets transmission slots of the plurality of transmitting nodes and a reception slot of the receiving node in accordance with the designated operation mode.

Furthermore, according to the constitution set forth above, the waveform data processing apparatus further comprises an instruction input section (206) that designates a logical link state between the transmitting nodes and the receiving node in response to an instruction from the user, and the controller (212) sets a reception slot for the receiving node in accordance with the designated link state and sets the transmission slots of the plurality of transmitting nodes.

Furthermore, according to the constitution set forth above, in the waveform data processing apparatus, the controller (212) detects a kind of system in which the waveform data processing apparatus is installed, and sets transmission slots of the plurality of transmitting nodes and a reception slot of the receiving node on the basis of the detection result.

DETAILED DESCRIPTION OF THE EMBODIMENTS

1. General Configuration of Embodiment

1.1. Overall Configuration

Figure 1:
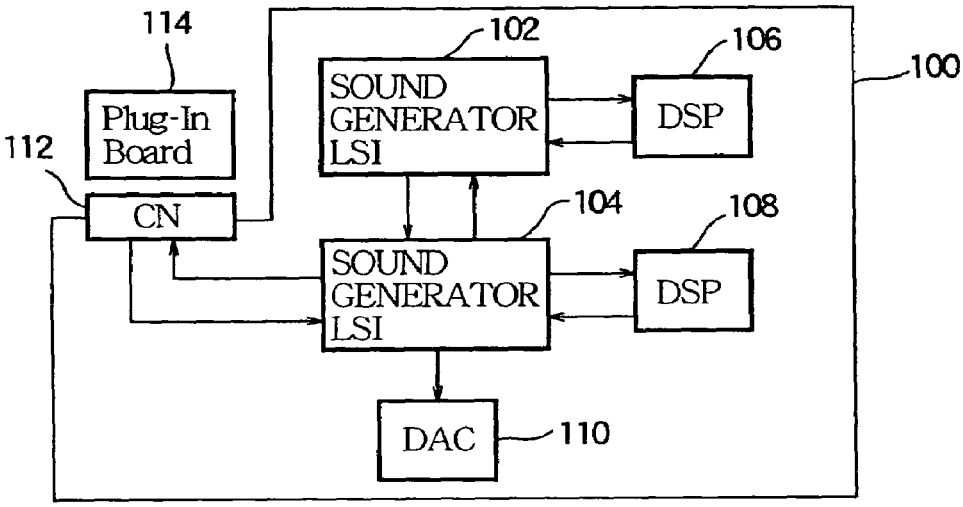
FIGS. 1(a) through 1(c) are block diagrams of a conventional sound generation unit and an inventive sound generation unit, respectively.
Figure 1:
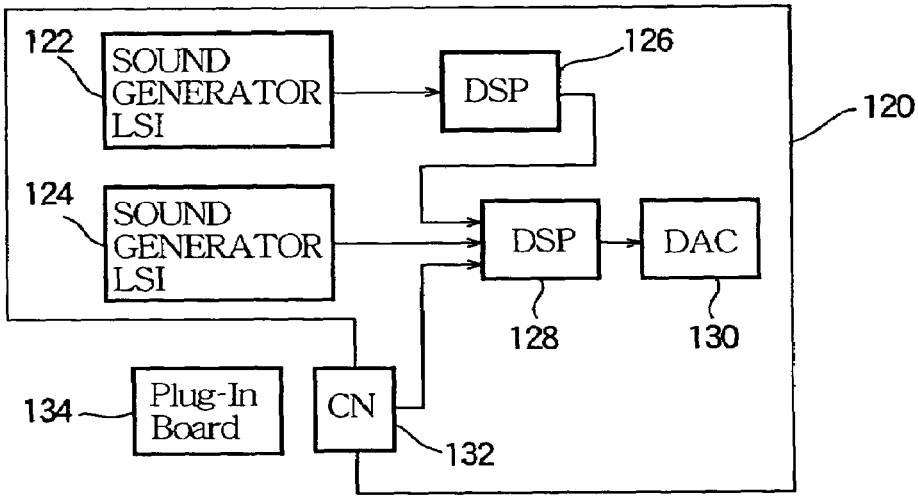
Figure 1:
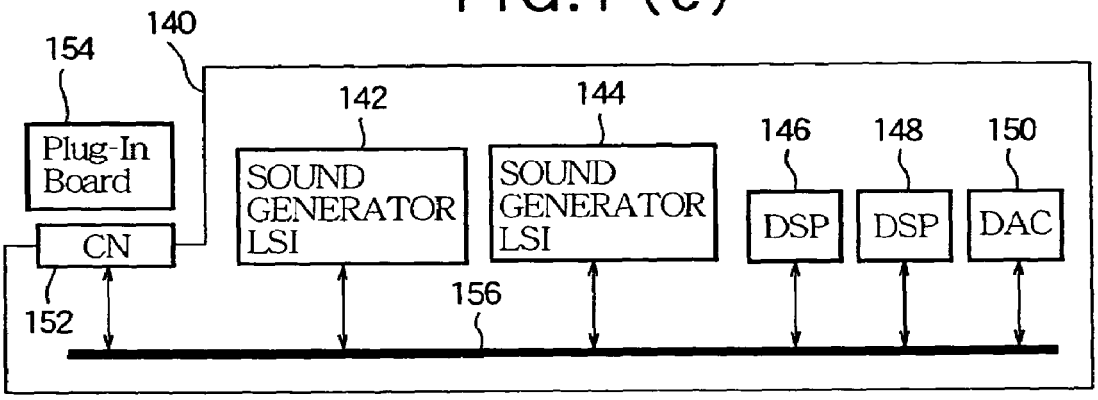
Figure 2:
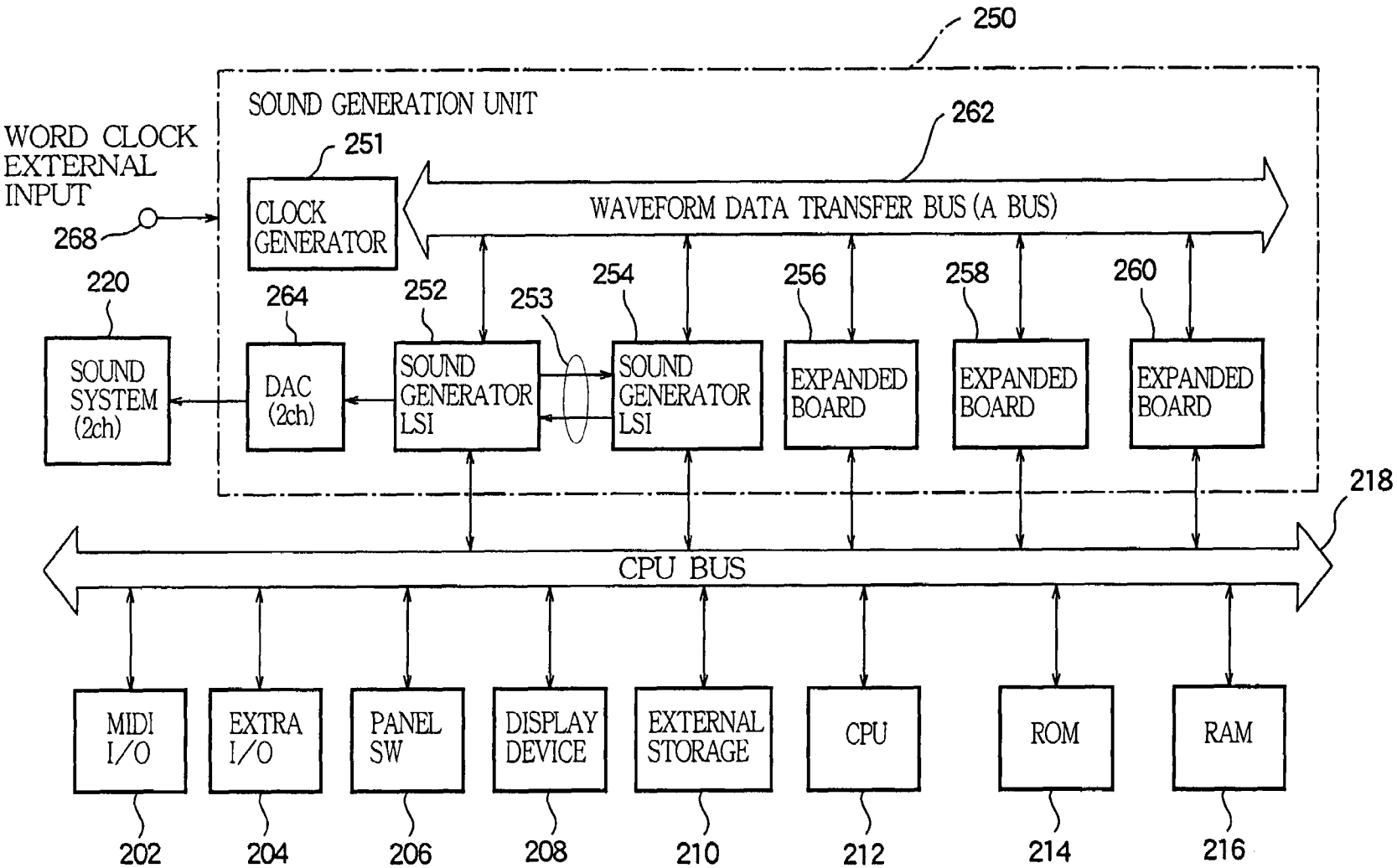
FIG. 2 is an overall block diagram of a musical sound synthesizing apparatus in one embodiment of the present invention.

Next, a hardware configuration of a musical sound synthesizing apparatus in one embodiment of the present invention will be described in reference to FIG. 2. In the drawing, 202 denotes a MIDI•I/O section, which inputs and outputs MIDI signals from and to external MIDI equipment. A performance operation terminal such as a keyboard or the like is connected to the MIDI•I/O section 202, and performance information from the performance operation terminal is input as MIDI signals. 204 denotes an extra I/O section, which inputs and outputs various kinds of signals other than the MIDI signals. 206 denotes a panel switch section, which is provided with various kinds of tone quality setting operation terminals and the like operated by users.

250 denotes a sound generation unit, which synthesizes musical sound signals by means of processing described later. 208 denotes a display device, which displays various kinds of information such as setting state of the sound generation unit 250 for the users. 210 denotes an external storage device, which is constituted by a hard disk, flexible disk and the like. 212 denotes a CPU, which controls each section of the musical sound synthesizing apparatus via a CPU bus 218 on the basis of a predetermined control program. 214 denotes a ROM, which stores the control program of the CPU and the like. 216 denotes a RAM, which is used as a work memory of the CPU 212.

Furthermore, inside the sound generation unit 250, 252, 254 denote sound generator LSIs, which generate waveform data on the basis of performance information, produced sound parameters and the like supplied via the CPU bus 218, and also apply effect processing to the waveform data on the basis of effect parameters or the like similarly supplied. 256, 258 and 260 denote expanded boards, which perform various kinds of processing such as synthesizing processing, effect processing and recording processing of the waveform data, suitably to their kinds, and enable the sound generation unit 250 to achieve desired functions together with the sound generator LSIs 252, 254.

262 denotes a bus (hereinafter referred to as A bus) for transferring waveform data, which transfers waveform data among the sound generator LSIs 252, 254 and expanded boards 256, 258 and 260. Generally, in a communication network, in many cases, a header including information such as an address of a transmitting end and transmission channel is attached to the data to be transmitted so as to constitute a packet, and this packet is transmitted. In addition, in order to avoid collision of transmitted data when a plurality of transmitting nodes starts transmission at the same time, the network is provided with a system that conducts arbitration based on identifiers and addresses of the nodes. As compared with such a network, since only the waveform data that are not attached with the transmitting-end address, transmission channel or the like are transmitted on the A bus 262, it is possible to accomplish a significantly high transmission efficiency per transmission clock. Controller (CPU 212) is connected to the respective transmitting nodes, which are connected to the A bus 262, via the bus (CPU bus 218) different from the A bus 262, and the controller sets different transmission timings to the respective transmitting nodes to prevent collision. The A bus 262 itself is not provided with an arbitration function, so that a configuration is much simpler than that of the conventional network.

Furthermore, as an amount of transferred waveform data is great between the sound generator LSIs 252 and 254, part of the waveform data is transmitted via direct connection lines 253. 264 denotes a DA converter, which converts part of the waveform data from an output channel of the sound generator LSI 252 into analog signals. Sound is produced from the converted analog signals via a sound system 220.

251 denotes a word clock generator, which generates a word clock WCK rising every sampling period. This word clock WCK is supplied to each section in the sound generation unit 250. 268 denotes a word clock external input terminal, which is provided to receive a word clock WCK from the external in place of the word clock WCK generated by the word clock generator 251. This is used to synchronize the sampling periods with external devices.

Out of the components mentioned above, a "sound board" in the present embodiment is constituted by the bus such as the CPU bus 218 or A bus 262, semiconductor circuits such as the MIDI•I/O section 202, extra I/O section 204, CPU 212, ROM 214, RAM 216, word clock generator 251, sound generator LSIs 252, 254 and DA converter 264, an interface (not shown) for connecting the external storage device 210, connectors (not shown) for connecting the panel switch section 206 and display device 208 to the CPU bus 218, connectors (not shown) for connecting the expanded boards 256, 258 and 260, and a power source circuit (not shown) which provides a power source to the entire. The connectors for the expanded boards 256, 258 and 260 are connected to both the CPU bus 218 and A bus 262, and these expanded boards are built detachably from the "sound board" via the connectors.

1.2. Bus Configuration and Timing

Figure 3:
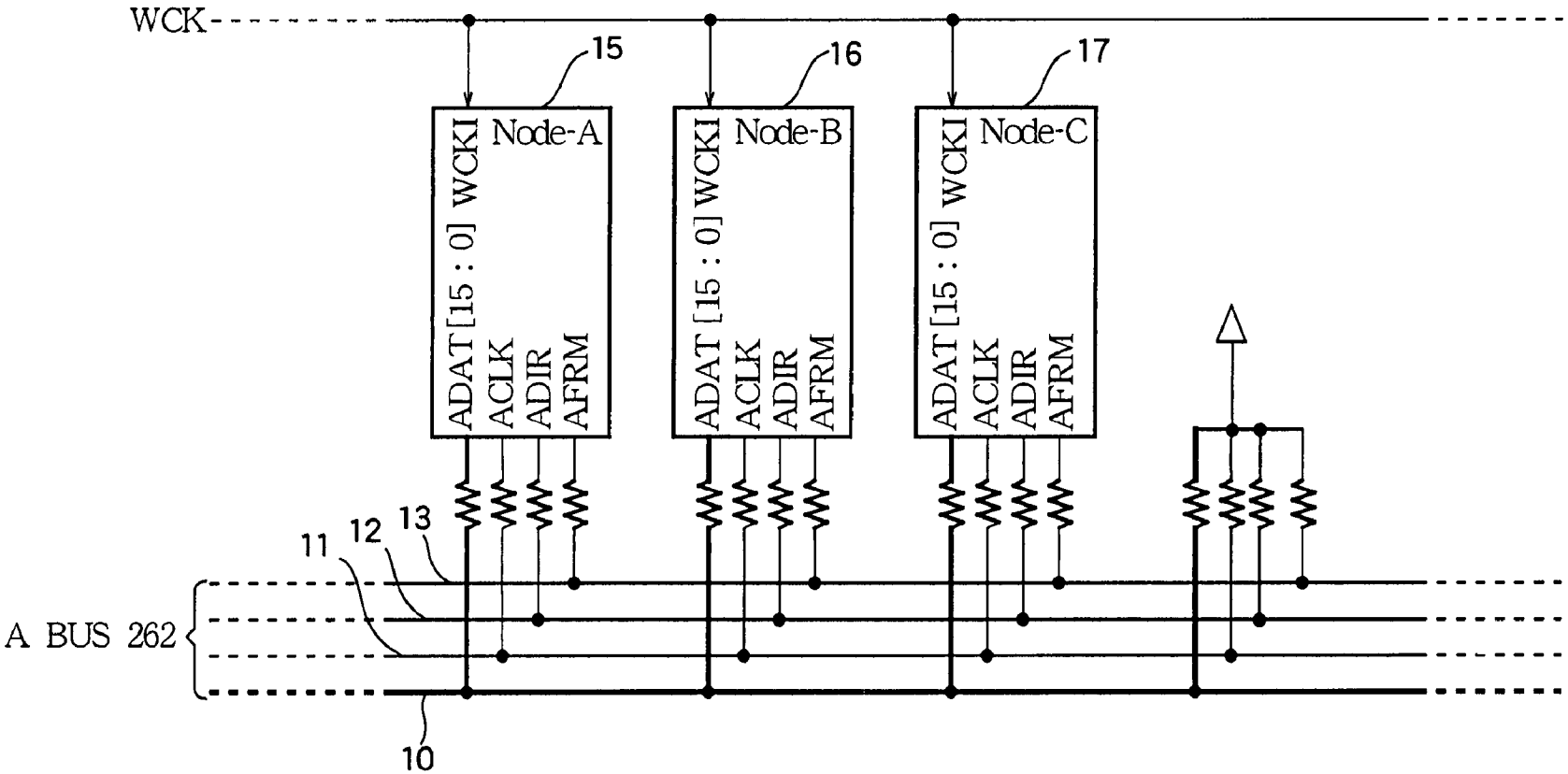
FIG. 3 is a circuit diagram showing a connection relationship between nodes and an A bus 262.

Those components such as the sound generator LSIs 252, 254 and expanded boards 256, 258 and 260 that input and output waveform data via the A bus 262 are called "nodes". A connection relationship between each node and the A bus 262 is shown in FIG. 3. In the drawing, the A bus 262 is constituted by a data signal line 10, and a clock signal line 11, a direction signal line 12 and a frame signal line 13 each having one bit. Either 16 bits or 4 bits can be selected for a bit width of the data signal line 10, and only part of it can have a 4-bit width. 15, 16 and 17 each denote nodes, which are, specifically, constituted by the abovementioned sound generator LSIs 252, 254, expanded boards 256, 258 and 260, or the like.

These nodes input and output data signals ADAT, direction signals ADIR and clock signals ACLK to and from the A bus 262. Input and output terminals for these signals are connected to the A bus 262 in a wired OR form. In other words, as long as a "0" signal is not output from any of the nodes, the signals on the A bus 262 always become "1". At the moment when one of the nodes outputs a signal such as the data signal ADAT, the input and output terminals of other nodes are set in a high impedance state, and an output signal from the above one node is received as necessary. Here, the data signal ADAT is a signal of the waveform data or the like that should be exchanged among the nodes. Further, the clock signal ACLK is a clock signal synchronous with the data signal ADAT.

The CPU 212 sets periods to output the data signal ADAT and clock signal ACLK for each node so as to prevent overlap. This period is referred to as a "frame". The direction signal ADIR is set to "0" during this frame period, thereby forbidding other nodes to output signals. Each node outputs a frame signal AFRM which rises earlier by an equivalent of one clock of the clock signal ACLK than the direction signal ADIR rise to "1". The frame assigned to each node is defined by "how many frames are there after the word clock WCK has risen". Therefore, it is possible for each node to know the timing to start its frame by counting the number of times that frames have been generated after the word clock WCK had risen (more specifically, by counting the number of times that the frame signal AFRM has risen).

Figure 4:
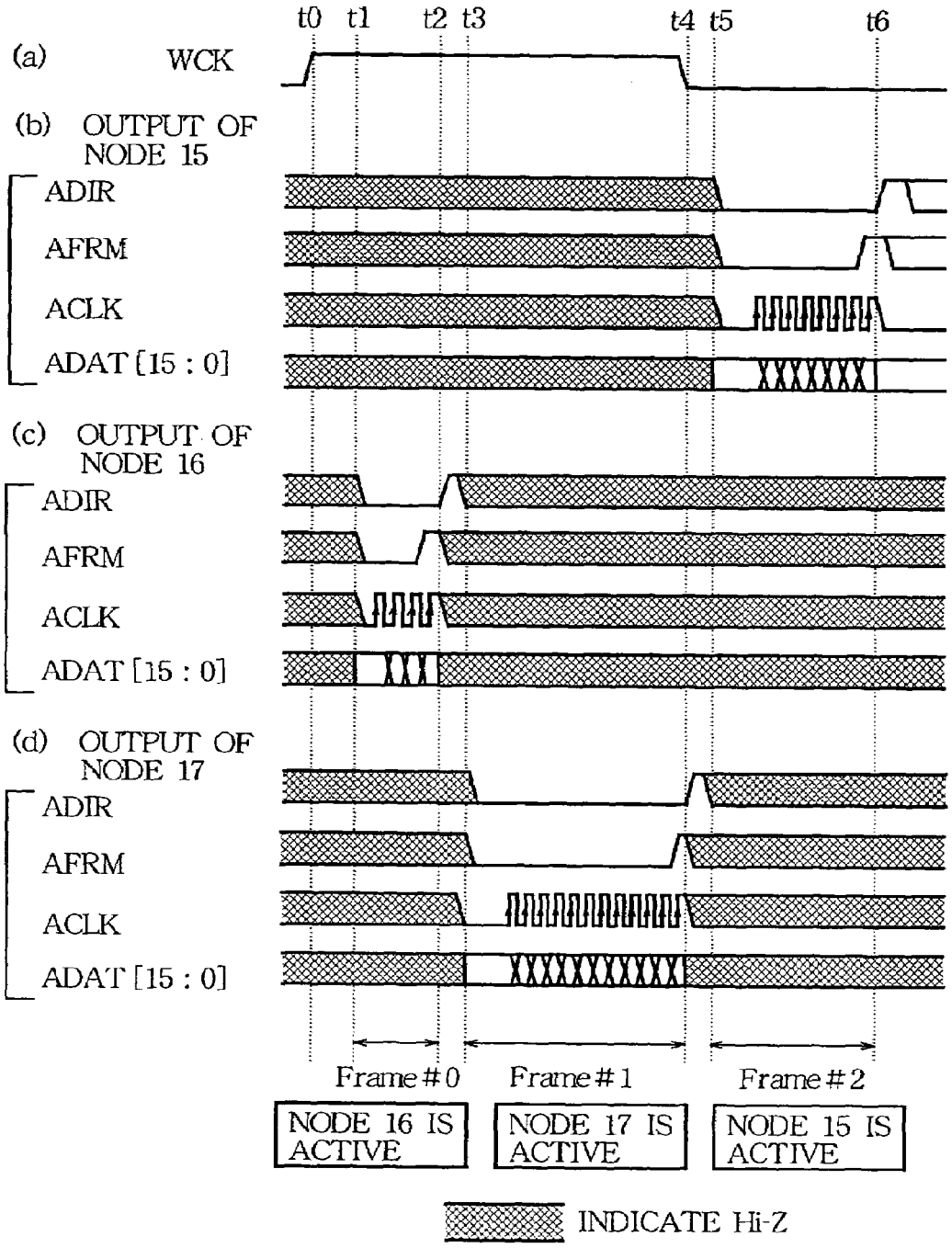
FIG. 4 is a timing chart (1/2) for describing operation of the circuit of FIG. 3.

Here, depending on the order of generation after the word clock WCK has risen, the frames are each indicated as frame #0, frame #1, frame #2, . . . . One or a plurality of transmission frames can be assigned to each node in one sampling period. Here, timing charts in which the frame #2 is assigned to the node 15, the frame #0 to the node 16, and the frame #1 to the node 17 as the transmission frames will be described in reference to FIG. 4 and FIG. 5.

The fact that the word clock WCK has risen at a time t0 of FIG. 4(a) is detected by the nodes 15, 16 and 17. In the node 16 to which the frame #0 is assigned, the direction signal ADIR and frame signal AFRM are raised to "0" at a time t1 when a predetermined period of time has passed after the time t0. Then, the clock signal ACLK is raised on every predetermined clock cycle, and in synchronization with this, the data signal ADAT is output per bit width (16 bits here) of the data signal line 10.

At a time t2 when data output from the node 16 is finished, the node 16 rises the direction signal ADIR to "1". The frame signal AFRM is raised to "1" one period of the clock signal ACLK earlier than the time t2. Detecting the first time that the frame signal AFRM rises on the A bus 262, the node 17 recognizes that a next frame is the frame #1 assigned to the node 17 itself.

After the direction signal ADIR has risen, the node 17 operates similarly to the abovementioned node 16 at a time t3 after a predetermined margin time has passed. That is, the direction signal ADIR and frame signal AFRM of the node 17 are raised to "0", and the clock signal ACLK is raised on every predetermined clock cycle, and in synchronization with this, the data signal ADAT is output to the data signal line 10. In addition, the margin time between the frames is provided to avoid collision of data.

Next, the fact that the node 17 has raised the frame signal AFRM to "1" is detected by the node 15. As this is the second time that the frame signal AFRM rises after the word clock WCK has risen, the node 15 recognizes that a next frame is the frame #2 assigned to the node 15 itself. After the direction signal ADIR of the node 17 has risen to "1" at a time t4, the node 15 performs output processing in the same manner as described above at a time t5 after a predetermined margin time has passed.

Figure 5:
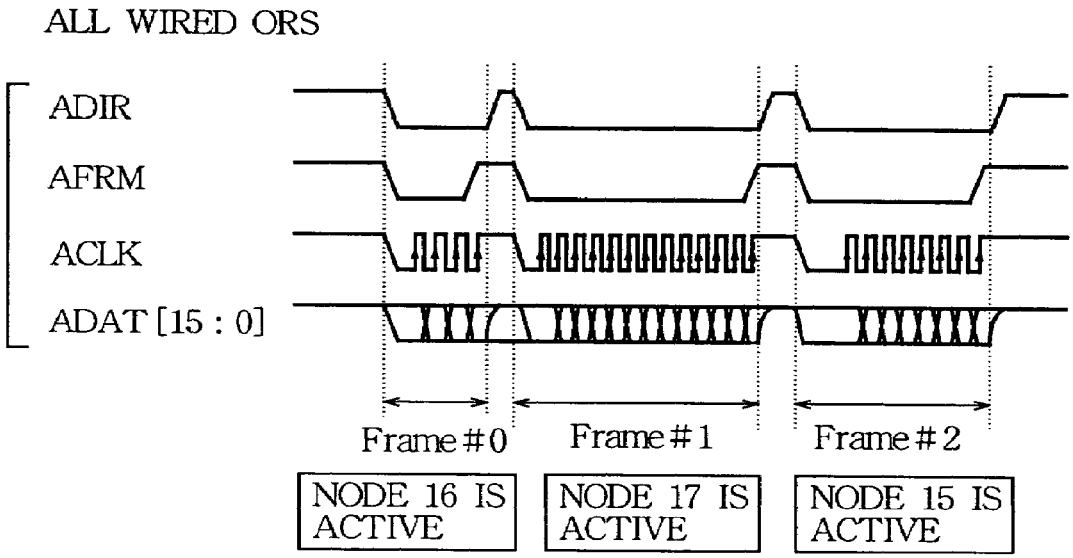
FIG. 5 is a timing chart (2/2) for describing operation of the circuit of FIG. 3.

One frame is assigned to each node in the example described above, but a plurality of transmission frames may be assigned to one node in one sampling period. In this way, after the output processing from all the frames is finished, the lines of the A bus 262 are kept in the high impedance state until the word clock WCK rises next. Here, the wired ORs having waveforms shown in FIGS. 4(a), (b) and (c), that is, the waveforms that actually emerge on the A bus 262 are shown in FIG. 5.

In the present embodiment, the clock cycle and clock speed of the clock signal ACLK can be optionally set for each node. In other words, in each node, the clock speed in one frame is set depending on the amount of data to be transmitted to other nodes and the bit width of the data signal line 10. Further, the clock cycle may preferably be decided in accordance with the node whose processing speed is the slowest, among the node which transmits data (hereinafter referred to as transmitting node) and one or a plurality of nodes which receives the data (hereinafter referred to as receiving node).

1.3. Format of Data Signal

As described above, either 16 bits or 4 bits can be selected for the bit width of the data signal line 10, and only one part of it can have a 4-bit width. If the 4-bit width is adopted, a data transfer speed is decreased, but the number of wires can be reduced. This can lower the cost for the connectors and the like, so that it is conceivable, for example, that the 4-bit width is adopted to only the parts contacting the expanded boards 256, 258 and 260 where the connectors are needed.

In such a case, when the transmitting node connected to the 16-bit width part of the data signal line 10 outputs data to both the 16-bit width receiving node and another 4-bit width receiving node, it is necessary to output data with bit widths corresponding to the respective receiving nodes. In that case, if a plurality of frames is assigned to the transmitting node per corresponding receiving node, it is possible to transmit the waveform data with the bit width that is changed for each frame.

Furthermore, even when the waveform data is transmitted to both of the receiving nodes, it is not always necessary to divide the waveform data into a plurality of frames, and the bit width may be set for each time slot. That is, data may be output with the 16-bit width in part of the time slots within one frame, and data may be output with the 4-bit width in other time slots. In this case, each receiving node recognizes the time slot that it needs in one frame, and thus receives a data signal with a corresponding bit width.

In the present embodiment, the width of data exchanged between nodes is basically 32 bits. A unit of 32 bits is referred to as "one unit" in the present specification. That is, one unit of data is output by use of 2 (=32/16) time slots when the data signal line 10 has a 16-bit width and by use of 8 (=32/4) time slots when the data signal line 10 has a 4-bit width. Bit arrays for the respective bit widths are shown in FIGS. 6(a), (b). A unit (16 bits or 4 bits) of data transmitted per time slot is referred to as "one word" in the present specification. In addition, when the transmitting node connected to the 16-bit width part of the data signal line 10 transmits data to the receiving node connected to the 4-bit width part, only high 4 bits of the data signal line 10 are used, and low 12 bits are always set to "0".

Generally, it is possible for electronic musical instruments to perform processing such as generation of musical sound signals of a plurality of channels. Plural units of data can be transmitted and received between the nodes in one frame, so that, for example, if one unit is assigned to one channel amount of data, the waveform data of a maximum of 32 bits of the channel corresponding to the unit can be exchanged between the nodes. Further, a stereo L channel and R channel may be assigned to one unit, and 16-bit waveform data of the L, R channels may be packed into the one unit. Alternatively, independent two channels may be assigned to one unit. A length of each frame is decided not depending on the number of channels of the waveform data to be transmitted in the frame, but depending on the number of units to which the channels to be transmitted are assigned.

1.4. General Configuration of Nodes

Next, a general configuration of the nodes will be described in reference to FIG. 7. In the drawing, 304 denotes a buffer amplifier, which buffers signals input and output to and from a node 300. 306 denotes a time slot conversion section, which converts the time slots of signals received by the node 300. Its details will be described later.

Figure 6:
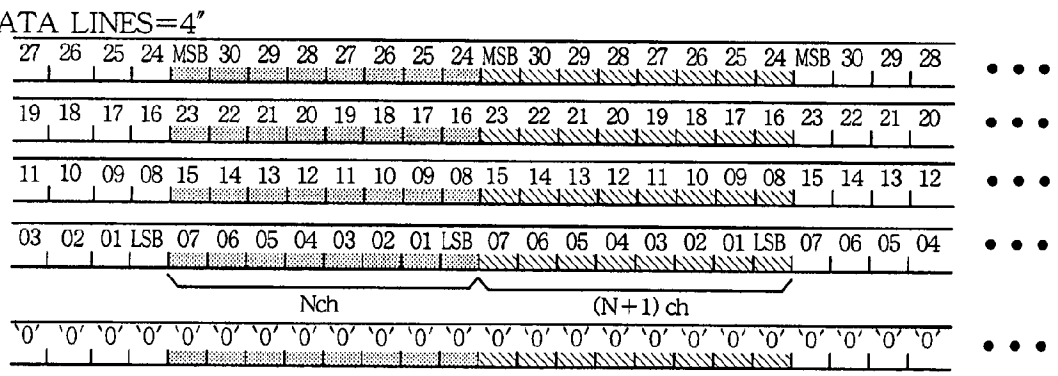
FIGS. 6(a) and 6(b) are diagrams showing arrays of bits corresponding to transmission bit widths.
Figure 6:
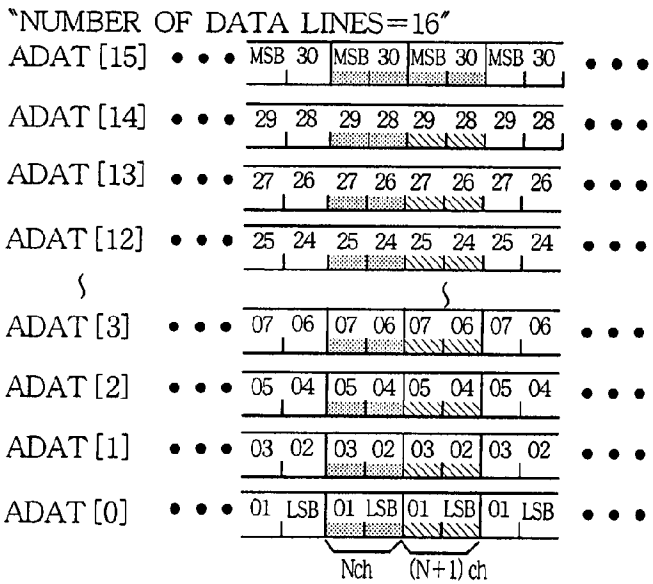

Here, in the original data signal ADAT, the bits are arrayed as described in FIG. 6. The same applies to a data signal ADAT' output from the time slot conversion section 306. 400 denotes a receiving section, which converts the bits into normal bit arrays per unit (32 bits). 320 denotes a waveform processing section, which performs various kinds of waveform processing corresponding to the respective nodes. More specifically, sound generation processing, mixer processing, effect processing, AD conversion, DA conversion, communication processing for a LAN, hard disk recording and the like can be taken as examples.

450 denotes a transmitting section, which converts the bit arrays of the data output from the waveform processing section 320 as described in FIG. 6, and outputs the result of this as the data signal ADAT, and also outputs the clock signal ACLK, frame signal AFRM and direction signal ADIR via the buffer amplifier 304. 470 denotes a control register, which stores various kinds of control data, micro programs and the like for the node 300. Contents in the control register 470 are set by the CPU 212 via the CPU bus 218. 302 denotes an operation clock generation section, which generates a system clock of the node 300, and also divides this system clock to generate the clock signal ACLK and the like for data output. Each of the nodes connected to the A bus 262 operates on the basis of an operation clock (individual operation clock) generated by its operation clock generation section, but may also operate with the supply of an operation clock (common operation clock) from the operation clock generation section of another node.

The control data stored in the control register 470 contains frame numbers assigned to the node 300, a period and clock speed of the clock signal ACLK, parameters for the waveform processing section 320, and the like. 490 denotes a parameter ROM, which stores the kind of node 300, the number of channels that permit transmission and receiving, parameters of maximum receiving and transmission rates and the like. Contents in the parameter ROM 490 are read by the CPU 212 when power is applied to the musical sound synthesizing apparatus.

Figure 7:
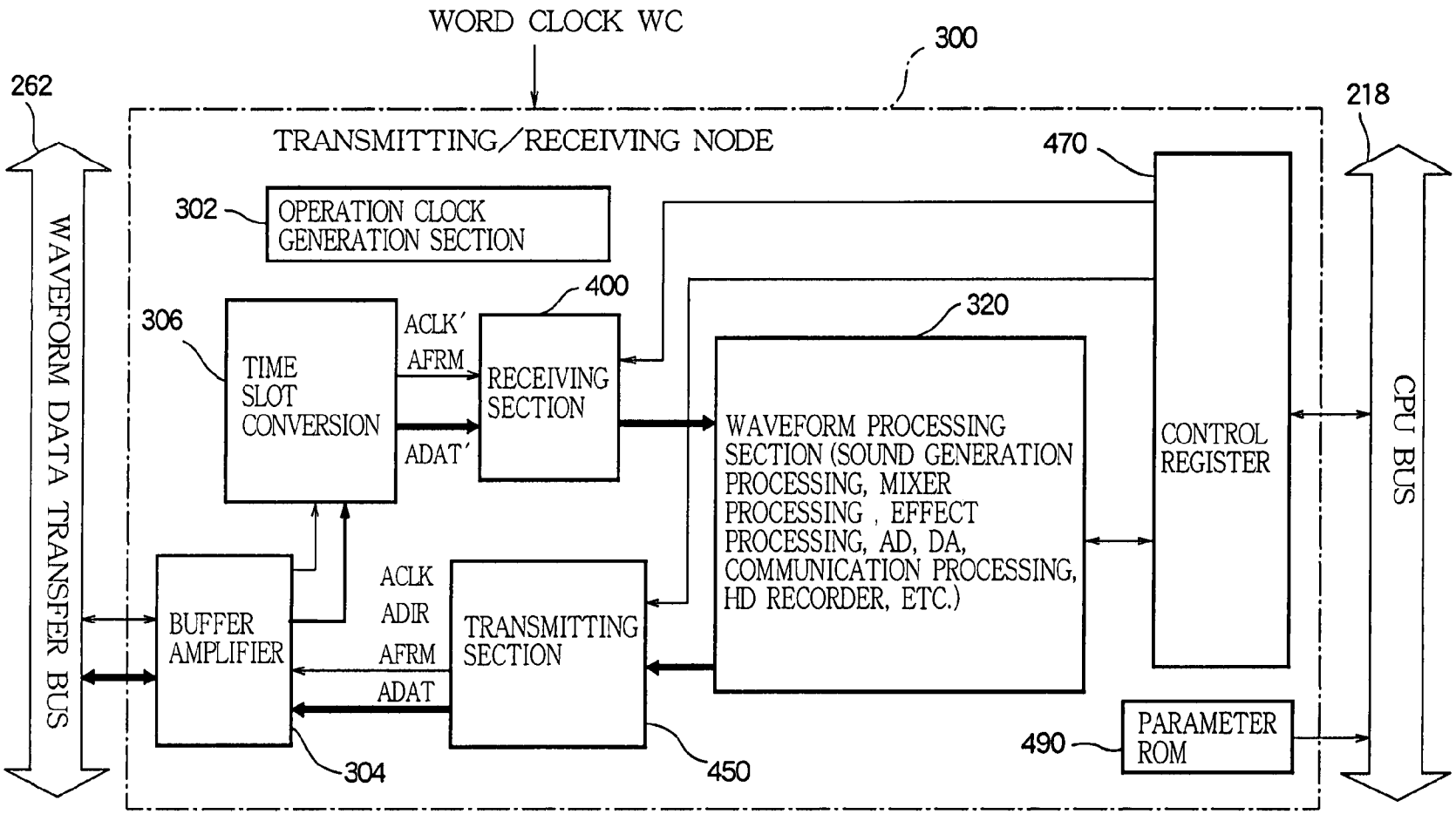
FIG. 7 is a block diagram showing a general configuration of each node.

Since the configuration in FIG. 7 is a general configuration of each of the nodes, the nodes of some kinds might not have some of the components shown. For example, if the node 300 is a sound generator or AD converter, the time slot conversion section 306 and receiving section 400 are not provided because it is not necessary to receive the waveform data and the like from other nodes. Further, if the node 300 is, for example, a DA converter, the transmitting section 450 is not provided because it is not necessary to transmit the waveform data and the like to other nodes.

1.4.1. Details of Time Slot Conversion Section 306

Figure 8:
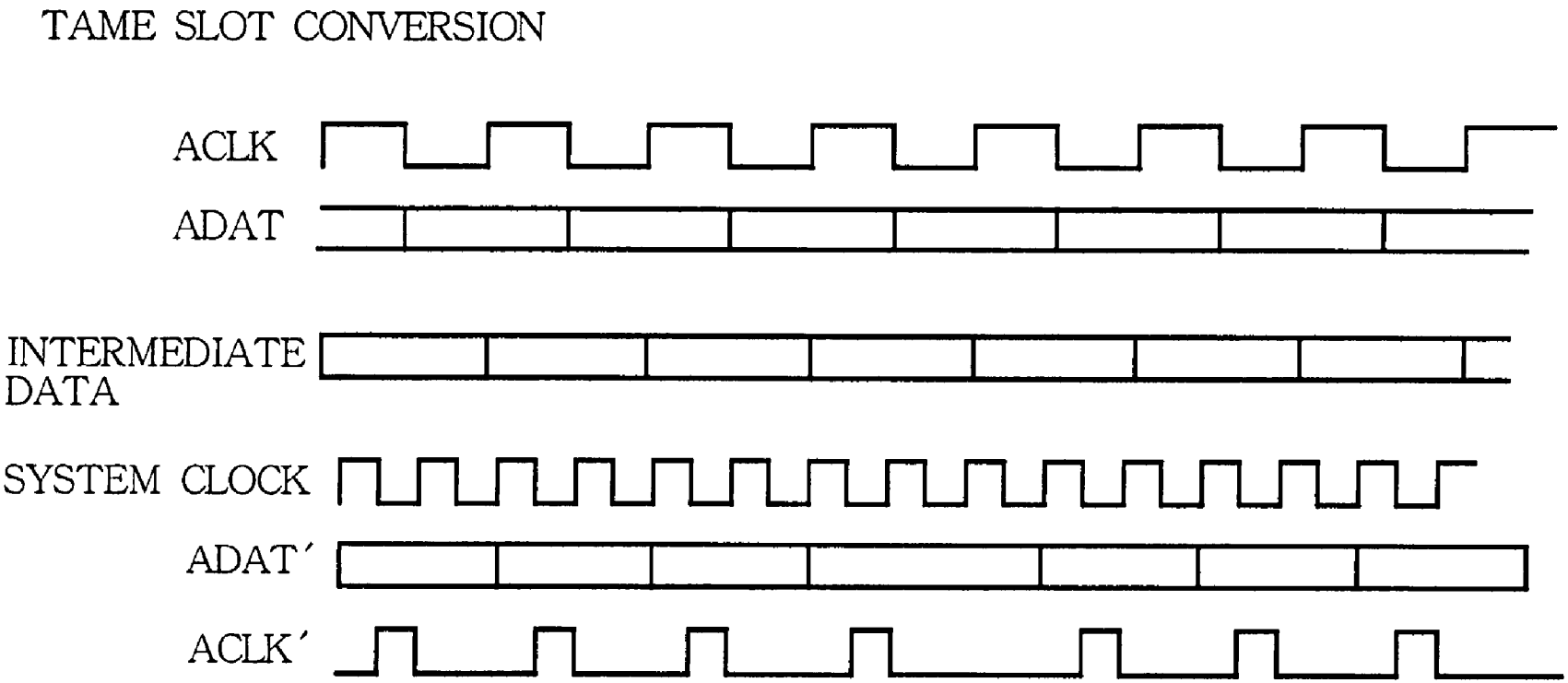
FIG. 8 is a diagram describing an operation of a time slot conversion section 306.

Details of the operation of the time slot conversion section 306 will here be described in reference to FIG. 8. In FIG. 8, the data signal ADAT and clock signal ACLK are signals received from the A bus 262 via the buffer amplifier 304. In the time slot conversion section 306, the data signal ADAT is latched at the right time when the clock signal ACLK rises. The result of this is "intermediate data" shown in a diagram.

Next, a "system clock" shown in the diagram is a clock generated by the operation clock generation section mentioned above, and has a frequency two times as high as that of the clock signal ACLK to be output, in the shown example. However, the shown clock signal ACLK, that is, the clock signal ACLK received via the buffer amplifier 304 is a signal generated by another node, and its frequency is not synchronized with the system clock of the node 300 because the system clocks of the nodes are independent of each other.

The intermediate data is latched every time the clock signal ACLK rises, and the latching result is the data signal ADAT' shown in the diagram. This data signal ADAT' is supplied to the receiving section 400. The clock signal ACLK is latched every time the system clock falls. A current latching result is compared with the latching result of the previous falling timing every time the clock signal ACLK is latched, and if a rising of the clock signal ACLK is detected (i.e., if the previous latching result is "0" and the current latching result is "1"), a fetch signal ACLK' is set to "1" in a half period of the system clock.

The fetch signal ACLK' is set to "0" in other cases. This fetch signal ACLK' is supplied to the receiving section 400 together with the data signal ADAT', as a timing signal for fetching in the data signal ADAT'. In this way, in the present embodiment, each receiving node generates the fetch signal ACLK' and data signal ADAT' in synchronization with the system clock generated by itself, so that it is possible to compensate for differences of frequencies and phases in the system clocks among the nodes.

1.4.2. Details of Receiving Section 400

Figure 9:
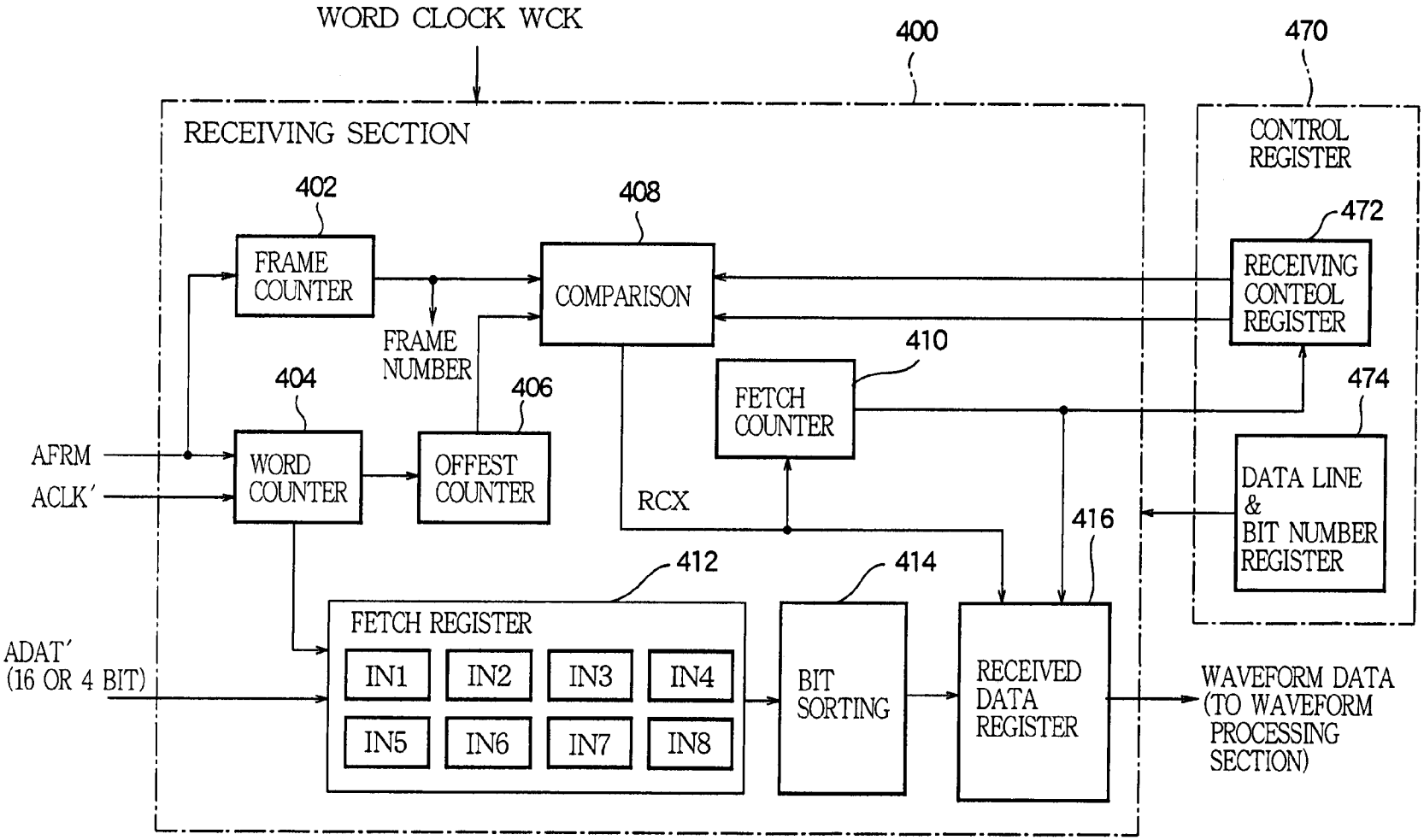
FIG. 9 is a block diagram of a receiving section 400.

Next, a detailed configuration of the receiving section 400 will be described in reference to FIG. 9, but the contents of the control register 470 associated with the receiving section 400 will first be described. In FIG. 9, 472 denotes a receiving control register, which has a plurality of addresses. Each address corresponds to each unit of the data to be received by the node 300, and at each address the frame number and offset value corresponding to each unit are stored in the order of generation. Here, the offset value is a unit number of data received in each of the reception frames.

For example, if the node 300 receives "100" units of data in one sampling period, a set of frame number and offset value is stored in an address "100" in the order of generation. 474 denotes a data line bit number register, which stores the bit width of the data signal ADAT correspondingly to the addresses of the receiving control register 472. In addition, the bit width of data in a unit, which is indicated by an offset value of the reception frame designated by the frame number, corresponds to the frame number and the offset value, so that it will be "16 bits" if a number stored in the data line bit number register 474 is "0", and "4 bits" if "1".

Furthermore, inside the receiving section 400, 402 denotes a frame counter, which counts the number of times that the frame signal AFRM on the A bus 262 has fallen, and is reset at the right time when the word clock WCK rises. In this way, a counting result of the frame counter 402 will be the frame number at the present moment. 404 denotes a word counter, which counts the number of fetch signals ACLK' in each frame, and is reset at the right time when each frame signal AFRM falls. In this way, a counting result of the word counter 404 will be a present word number in each frame.

406 denotes an offset counter, which outputs the offset value (unit number) of the frame presently being received by counting the word numbers output from the word counter 404. More specifically, the bit width of the data signal ADAT' presently being received is specified on the basis of the content stored in the data line bit number register 474, so that if the bit width is "16", the word number divided by "2" is the present offset value, and if the bit width is "4", the word number divided by "8" is the present offset value.

410 denotes a fetch counter, which stores read addresses of the receiving control register 472 and data line bit number register 474. This fetch counter 410 is incremented by "1" in accordance with coincidence signals RCX described later, and reset by the word clock WCK. Counting results of the fetch counter 410 are used as the read addresses of the receiving control register 472 and data line bit number register 474. Therefore, at the start of each sampling period, the frame number, offset value and bit width of an address "0" of the registers 472, 474 are read.

408 denotes a comparator, which compares the frame number output by the frame counter 402 with the frame number stored in the present read address of the receiving control register 472, and also compares the offset value output by the offset counter 406 with the offset value stored in the present read address of the receiving control register 472. If both the frame number and the offset value correspond, the coincidence signal RCX is raised to "1". If at least one of the frame number or offset value does not correspond, the coincidence signal RCX is set to "0".

Now, when the coincidence signal RCX rises to "1", the count result of the fetch counter 410 is incremented by "1". Accordingly, contents in the next address of the registers 472, 474 will then be read, and the coincidence signal RCX immediately falls to "0". 412 denotes a fetch register section, which is composed of 4-bit registers IN1 to IN8. When the bit width of the data signal ADAT' is "4", data of "8" words are sequentially latched by the registers IN1 to IN8 in the successive "8" slots.

Furthermore, when the bit width of the data signal ADAT' is "16", data of successive "2" slots are latched. That is, the data of the first slot is latched by the registers IN1 to IN4, and the data of the next slot is latched by the registers IN5 to IN8. 414 denotes a bit sorting section, which sorts the bits of the data latched by the registers IN1 to IN8 into the normal bit arrays per unit (32 bits).

416 denotes a received data register, which latches the sorted data synchronously with the coincidence signal RCX. The received data register 416 has a plurality of addresses, and can store one unit of waveform data for each address. The counting results of the fetch counter 410 mentioned above are used for write addresses into the received data register 416. The waveform data stored by the received data register 416 is read by the waveform processing section 320 as needed.

1.4.3. Details of Transmitting Section 450

Figure 10:
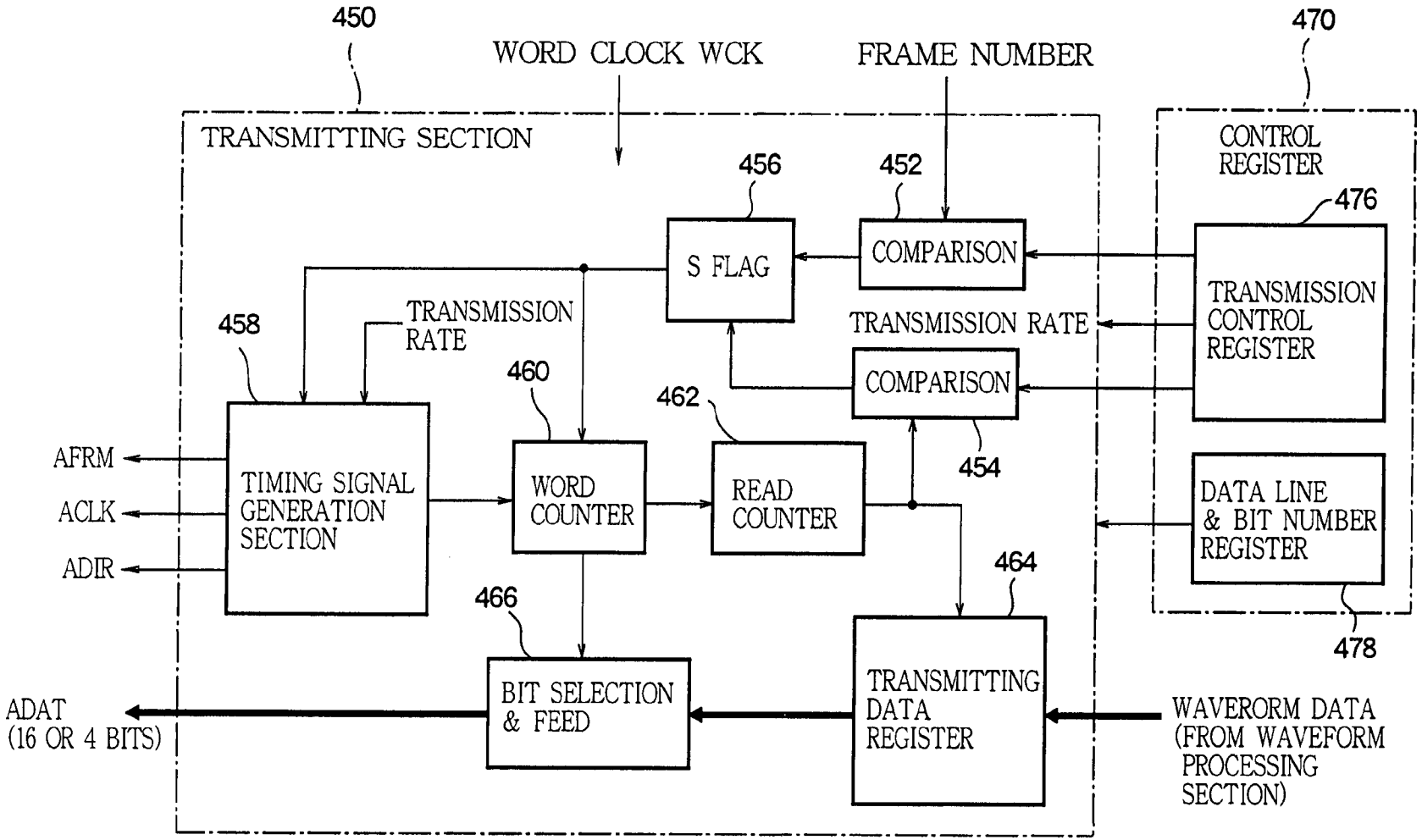
FIG. 10 is a block diagram of a transmitting section 450.

Next, a detailed configuration of the transmitting section 450 will be described in reference to FIG. 10, but the contents of the control register 470 associated with the transmitting section 450 will first be described. In the drawing, 476 denotes a transmission control register, which stores the frame numbers of one or a plurality of transmission frame(s) in which the node 300 transmits data. A transmission rate and the number of units of transmission data are stored for each transmission frame. Here, the "transmission rate" is represented by a division ratio to the system clock of the output clock signal ACLK.

Furthermore, 478 denotes a data line bit number register, which stores the number of bits of the transmission data signal ADAT in each of the transmission frames. In addition, the bit width in the transmission frame is "16 bits" if a value stored by the data line bit number register 478 is "0", and "4 bits" if "1". As described above, a plurality of transmission frames can be assigned to one node in one sampling period, in the present embodiment. In this way, for example, the data signal ADAT can be output at a high rate in one transmission frame to the receiving nodes with high processing speed, and the data signal ADAT can be output at a low rate in other transmission frames to other receiving nodes with low processing speed. Moreover, it is preferable that individual different transmission frames are also assigned to a plurality of receiving nodes with different bit width (4 or 16 bits) of data line.

Inside the transmitting section 450, 452 denotes a comparator, which compares the frame number of each transmission frame stored by the transmission control register 476 with the present frame number supplied from the frame counter 402 in the receiving section 400, and outputs a signal "1" if the present frame number corresponds to the frame number of any frame. Further, 454 denotes a comparator, which compares, in each frame, the number of transmission units in the transmission frame with the counting result of a read counter 462 described later, and outputs a signal "1" if the counting result is below the number of transmission units.

456 denotes an S flag setting circuit, which sets an S flag (transmission flag) to "1" in a state where the comparators 452, 454 both outputs the signal "1", and sets the S flag to "0" in other cases. 458 denotes a timing signal generation section, which generates the clock signal ACLK on the basis of the transmission rate stored by the transmission control register 476 and sets both the direction signal ADIR and frame signal AFRM to "0" when the S flag rises to "1".

Furthermore, in the timing signal generation section 458, the frame signal AFRM is first raised to "1" when the S flag becomes "0". Then, output of the clock signal ACLK is stopped one period of the clock signal ACLK late, and the direction signal ADIR is raised to "1" (see FIG. 4). 460 denotes a word counter, which counts the output clock signals ACLK. 464 denotes a transmission data register, which stores one unit of waveform data for each of a plurality of addresses. In addition, the waveform data is written by the waveform processing section 320 at an optional moment of the sampling period prior to the sampling period for transmission.

462 denotes the read counter, which counts the number of transmitted units on the basis of the values stored by the data line bit number register 478, in the same manner as the offset counter 406 in the receiving section 400 described above. The counting results are supplied as the read addresses to the transmission data register 464. In this way, the 32-bit waveform data stored by the transmission data register 464 are sequentially accessed and read. 466 denotes a bit selection section, which selects part of the bits (see FIG. 6) to be transmitted out of the 32-bit waveform data in accordance with the counting results of the word counter 460. The selected bits are output as the data signal ADAT via the buffer amplifier 304.

2. Specific Configuration of Embodiment 2.1. Specific Configuration Example of Waveform Processing Section 320

Figure 11:
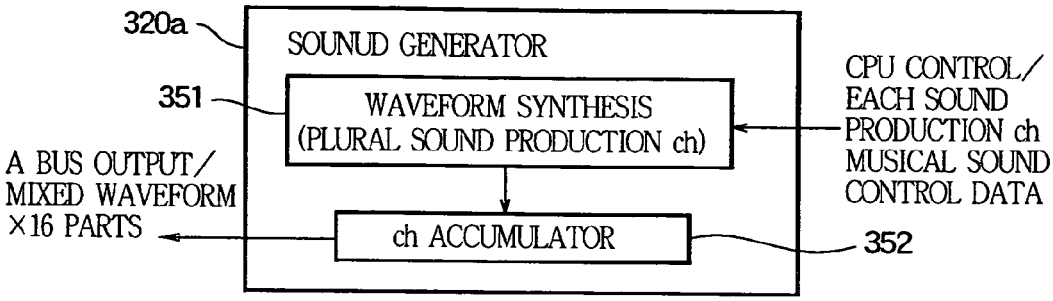
FIGS. 11(a) through 11(c) are block diagrams showing specific configurations of a waveform processing section 320.
Figure 11:
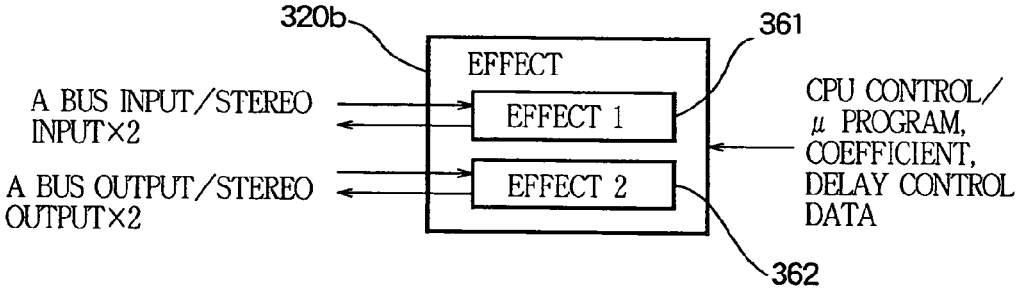
Figure 11:
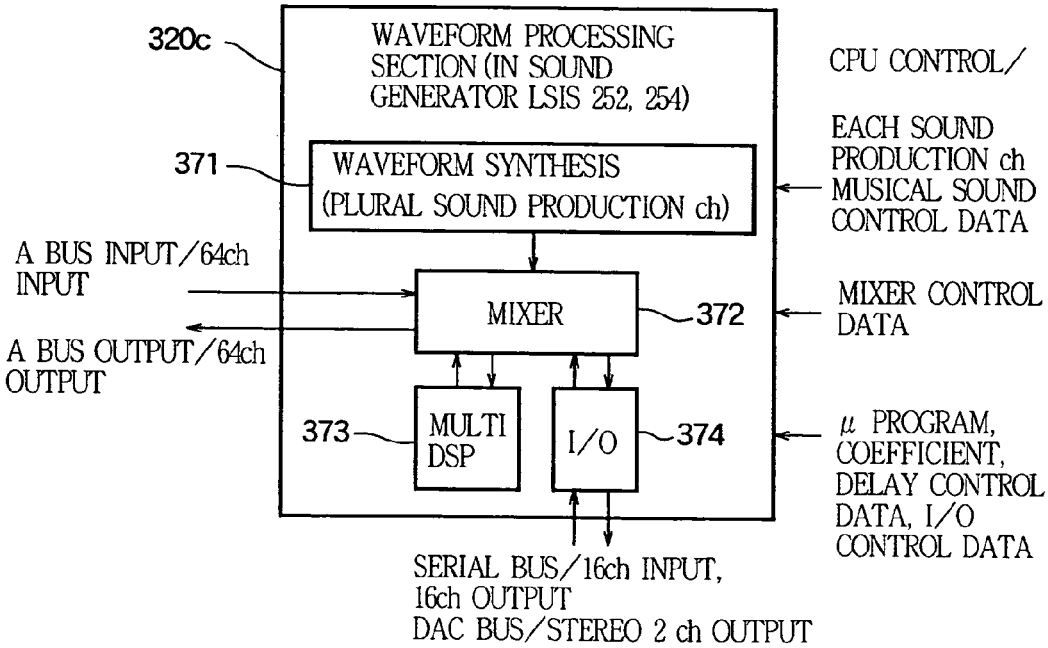

Next, a specific configuration example of the waveform processing section 320 is shown in FIGS. 11(a) to (c). A waveform processing section 320a in FIG. 11(a) is an example in which the waveform processing section 320 constitutes a sound generator. For the waveform processing section 320a, musical sound control data of each sound production channel is stored in the control register 470 (see FIG. 7) under the control of the CPU 212. 351 denotes a waveform synthesizing section, which synthesizes the waveform data of a plurality of sound production channels on the basis of the musical sound control data. 352 denotes a channel accumulator, which weights the synthesized waveform data of the sound production channels part by part to accumulate them, thereby outputting 16 parts of waveform data.

The synthesized 16-part of waveform data is output onto the A bus 262 via the transmitting section 450. Here, one part of the waveform data is assigned to one unit on the A bus 262. As to forms of accumulation, for example, the waveform data of the sound production channel in each part that produces monaural sound may be accumulated in one series to generate one-channel waveform data, or a pan may be controlled to accumulate in two series so as to generate two-channel waveform data. When sound is produced in stereo, it is preferable to place sound production channels which produce L (left) and R (right) sounds of the same tone each in different parts.

Next, a waveform processing section 320b in FIG. 11(b) is an example in which the waveform processing section 320 constitutes an effector. 361 denotes an effect processing section, which receives the waveform data (4 channels in total) of stereo signals in two series from the A bus 262 via the receiving section 400, and outputs a result of effect-processed waveform data to the A bus 262 via the transmitting section 450. The content of the effect processing is decided by the micro program, effect coefficient and delay control data that are set in the control register 470 by the CPU 212. In addition, an effect processing section 362 is configured similarly to the effect processing section 361.

Next, a waveform processing section 320c in FIG. 11(c) is an example in which functions such as sound generator, mixer and effector are collected in one chip, and used as the waveform processing section 320 in the node 300 of the above-mentioned sound generator LSIs 252, 254. In the drawing, 371 denotes a waveform synthesizing section, which receives the musical sound control data from the CPU 212 via the control register 470, and on the basis of this, generates the waveform data of a plurality of sound production channels. 372 denotes a mixer, which applies mixing processing to various kinds of waveform data. Part of the input waveform data for mixing processing is supplied from the A bus 262 via the receiving section 400, and part of the output waveform data is output to the A bus 262 via the transmitting section 450.

373 denotes a multi DPS (plural blocks of DSPs), which applies effect processing or the like to the waveform data supplied from the mixer 372, and supplies the results to the mixer 372. The micro program, effect coefficient, delay control data and the like that specify the effect processing are set in the control register 470 by the CPU 212. 374 denotes an I/O section, which carries out 16-channel input and output to and from a serial bus, and carries out 2-channel input and output to and from a bus for the DA converter.

Here, a channel configuration in the mixer 372 will be described in reference to FIG. 12. The mixer 372 secures a total of 176 channels as input channels including 64 channels (TG#1 to TG#64) for the output data of the waveform synthesizing section 371, 32 channels (DSP#1 to #32) for the output data of the multi DPS 373, and 80 channels (EXT#1 to #80) for inputting data from the external of the waveform processing section 320c. In addition, 64 channels in the 80 channels for data input are for inputting data from the A bus 262, and remaining 16 channels are for inputting data from the I/O section 374. Further, with the number of channels for data input less than "80", these channels may be used by being selectively assigned to input data from the A bus 262 (64 maximum) and to input data from the I/O section 374 (16 maximum).

A total of 400 mixing channels (MIX#1 to #400) are provided for, for example, level adjustment of the waveform data thus input. Moreover, at least 114 output channels are secured which mix and output data output from the mixing channels. The output channels include 32 channels (DSP#1 to #32) for the multi DPS 373 and 82 channels (EXT#1 to #82) for external output. In addition, the 82 channels for data output include 64 channels for outputting data to the A bus 262 and the remaining 18 channels for outputting data to the I/O section 374. Further, with the number of channels for data output less than "82", these channels may be used by being assigned to output data to the A bus 262 (64 maximum) and to output data to the I/O section 374 (18 maximum).

2.2. Specific Example of Overall Configuration (1)

Figure 13:
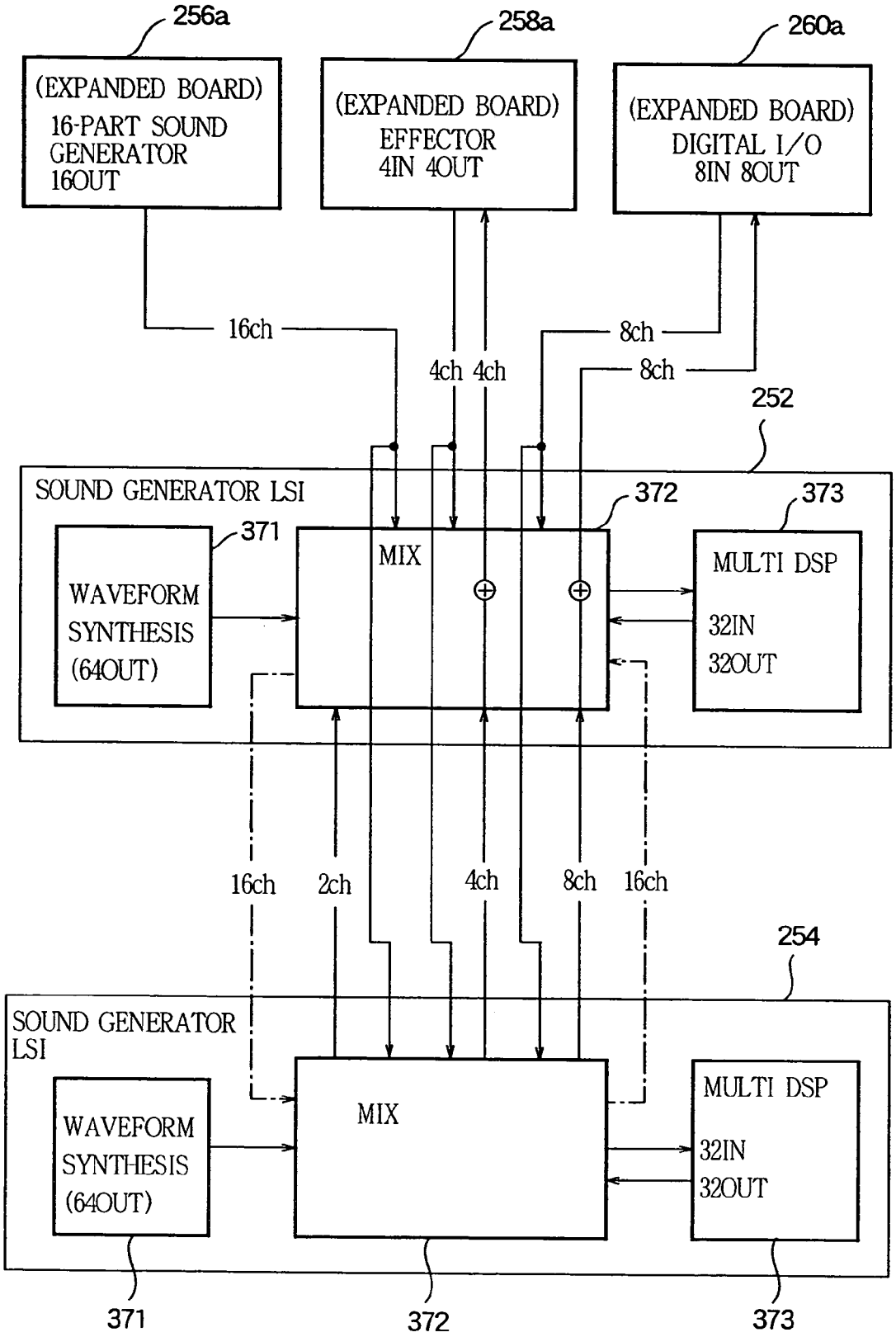
FIG. 13 is a block diagram showing a logical connection state when a sound generation unit 250 constitutes a normal sound generator.

Next, an example will be described in which specific functions are set for the sound generator LSIs 252, 254 and the expanded boards 256, 258 and 260, in the sound generation unit 250 of the present embodiment. First, FIG. 13 shows an example of logical connection among those components when the sound generation unit 250 constitutes a normal sound generator. In the drawing, a 16-part sound generator 256a, effector 258a and digital input output section 260a are each inserted as the expanded boards 256, 258 and 260.

The 16-part sound generator 256a outputs 16-channel waveform data, and its configuration is as described in FIG. 11(a). The effector 258a applies effect processing to input 4-channel (two stereo sets) waveform data to output 4-channel waveform data, and its configuration is as described in FIG. 11(b). The digital input output section 260a inputs and outputs 8-channel digital audio signals to and from the external device.

Figure 12:
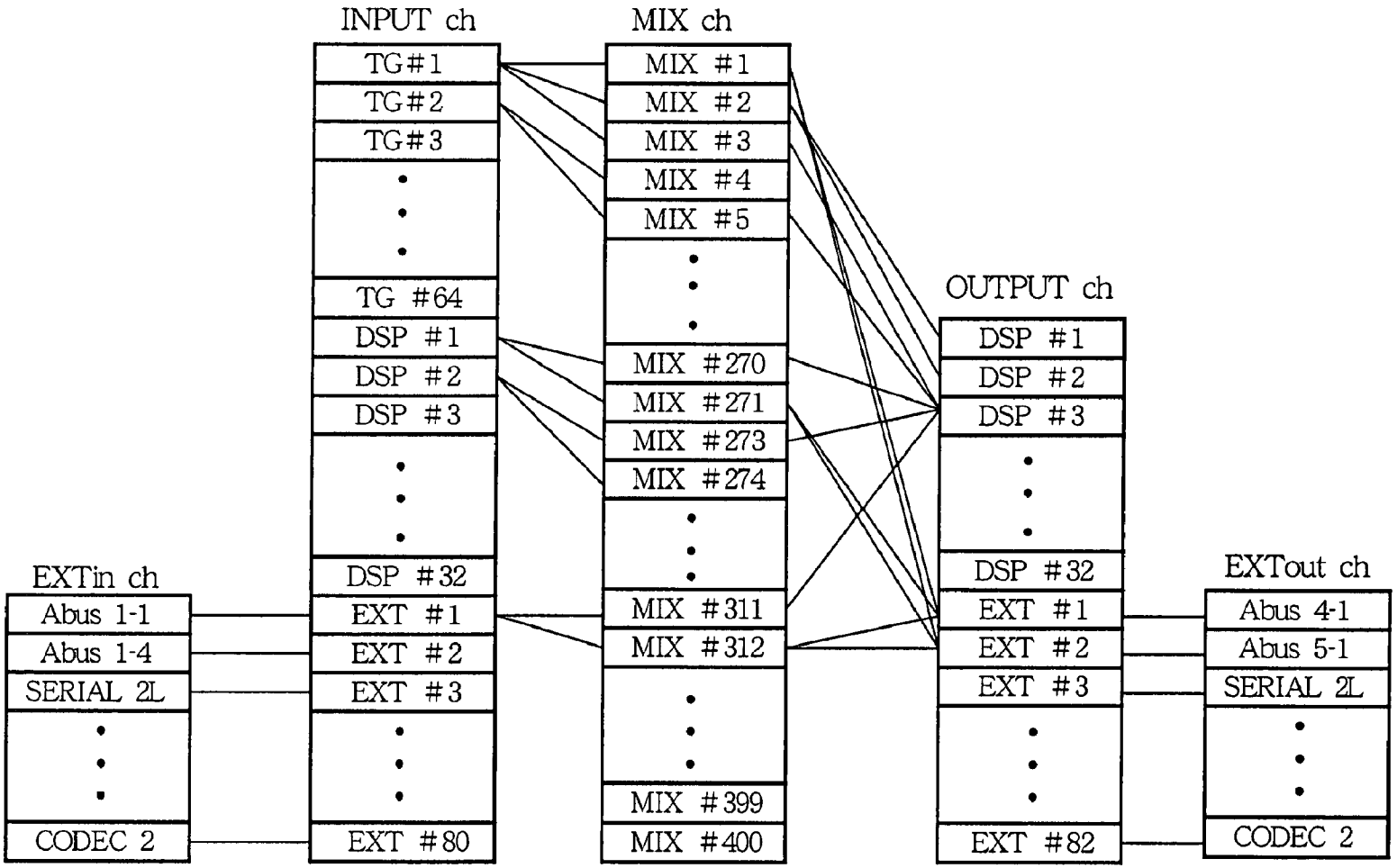
FIG. 12 is a diagram showing a channel configuration in a mixer 372.

Internal configurations of the sound generator LSIs 252, 254 are as described in FIG. 11(c) and FIG. 12. More specifically, the waveform synthesizing sections 371, 371 in the sound generator LSIs 252, 254 each synthesize 64-channel waveform data, and the multi DPSs 373, 373 apply effect processing to the waveform data, and then the mixers 372, 372 mix the waveform data with the waveform data supplied from other components 256a, 258a and 260a or the waveform data exchanged between the sound generator LSIs 252 and 254.

In FIG. 13, arrows connecting the components indicate logical connection states among the components. Among these, dashed connection lines between the sound generator LSIs 252 and 254 pass through the direct connection line 253, and other connection lines pass through the A bus 262. In FIG. 13, the 16-channel waveform data output from the 16-part sound generator 256a are each input to the sound generator LSIs 252, 254 via the A bus 262.

Furthermore, from the sound generator LSI 254 to the sound generator LSI 252, 16-channel waveform data is supplied via the direct connection line 253, and 14-channel waveform data is supplied via the A bus 262. In the latter 14-channel waveform data, 2 channels are provided for transmission of the waveform data output in stereo from the sound generator LSI 252, and this waveform data is mixed with the waveform data output in stereo from the sound generator LSI 252 in the mixer 372 of the sound generator LSI 252. The mixed stereo waveform data is output to the DA converter 264 via the I/O section 374 of the sound generator LSI 252. Moreover, 4 channels provide the waveform data to which effect processing is applied by the effector 258a, and 8 channels provide the waveform data to be output to the external via the digital input output section 260a.

The 4-channel and 8-channel waveform data are mixed with other waveform data generated by the sound generator LSI 252, and the 4-channel and 8-channel waveform data resulted from the mixing are respectively supplied to the effector 258a and the digital input output section 260a. The effector 258a applies effect processing to the 4-channel waveform data supplied via the sound generator LSI 252, and the result is output as the 4-channel waveform data to the sound generator LSIs 252, 254.

Figure 14:
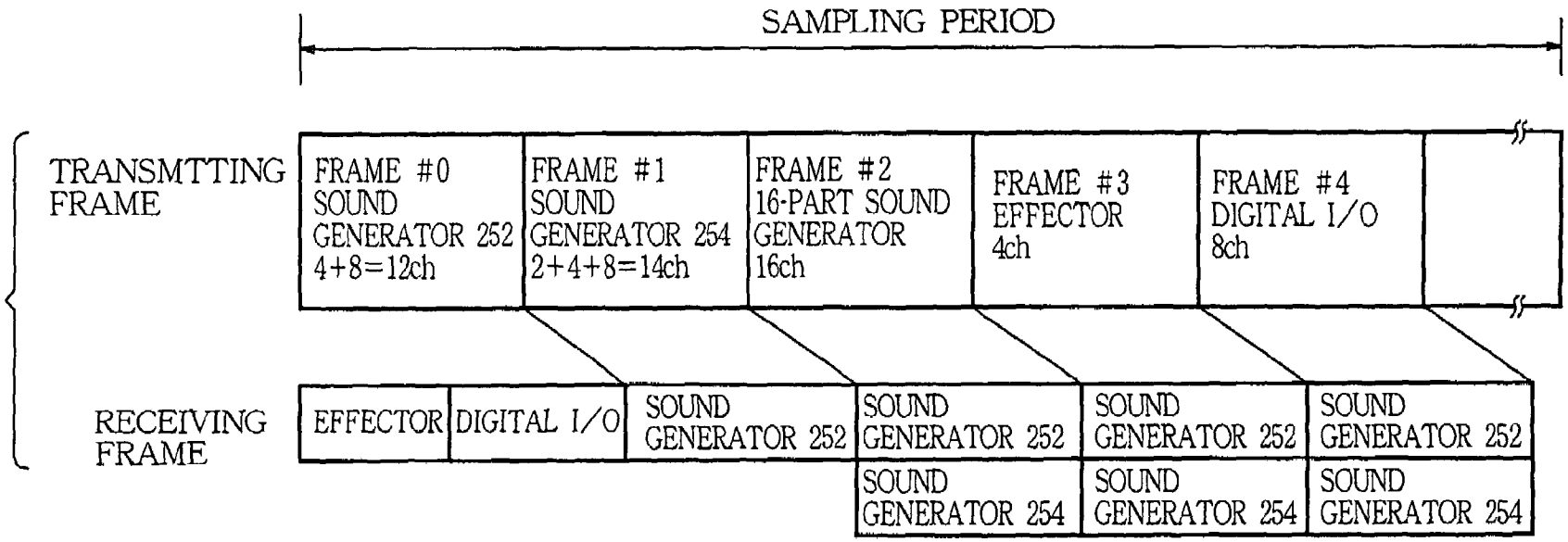
FIG. 14 is a diagram showing an example of frame assignment to realize the logical connection state of FIG. 13.

The digital input output section 260a outputs the 8-channel waveform data, which is supplied from the sound generator LSI 252, to the external device as digital audio signals, and also supplies 8-channel audio signals received from the external device to the sound generator LSIs 252, 254. Next, FIG. 14 shows an example of frame assignment to realize the aforementioned logical connection state. In the drawing, a frame #0 is assigned as a transmission frame of the sound generator LSI 252. The effector 258a is provided with 4 channels and the digital input output section 260a is provided with 8 channels for the waveform data output from the sound generator LSI 252 to other components via the A bus 262, so that a time equivalent to a total of 12 channels (time equivalent to 12 units if one unit is assigned to one channel) is assigned to the frame #0.

Furthermore, a frame #1 is assigned as a transmission frame of the sound generator LSI 254. Only 14-channel waveform data is output to the sound generator LSI 252 as the waveform data output to other components from the sound generator LSI 254 via the A bus 262, so that a time equivalent to 14 channels (time equivalent to 14 units) is assigned to the frame #1. Further, a frame #2 is assigned as a transmission frame of the 16-part sound generator 256a. The 16-part sound generator 256a outputs 16-channel waveform data to the sound generator LSIs 252, 254, but these sound generator LSIs perform reception at the same time, so that a time equivalent to 16 channels is assigned to the frame #2. Similarly, frames #3, #4 are each assigned as transmission frames of the effector 258a and the digital input output section 260a, and lengths corresponding to the number of output channels of the waveform data are assigned to the frames #3, #4.

2.3. Specific Example of Overall Configuration (2)

Figure 15:
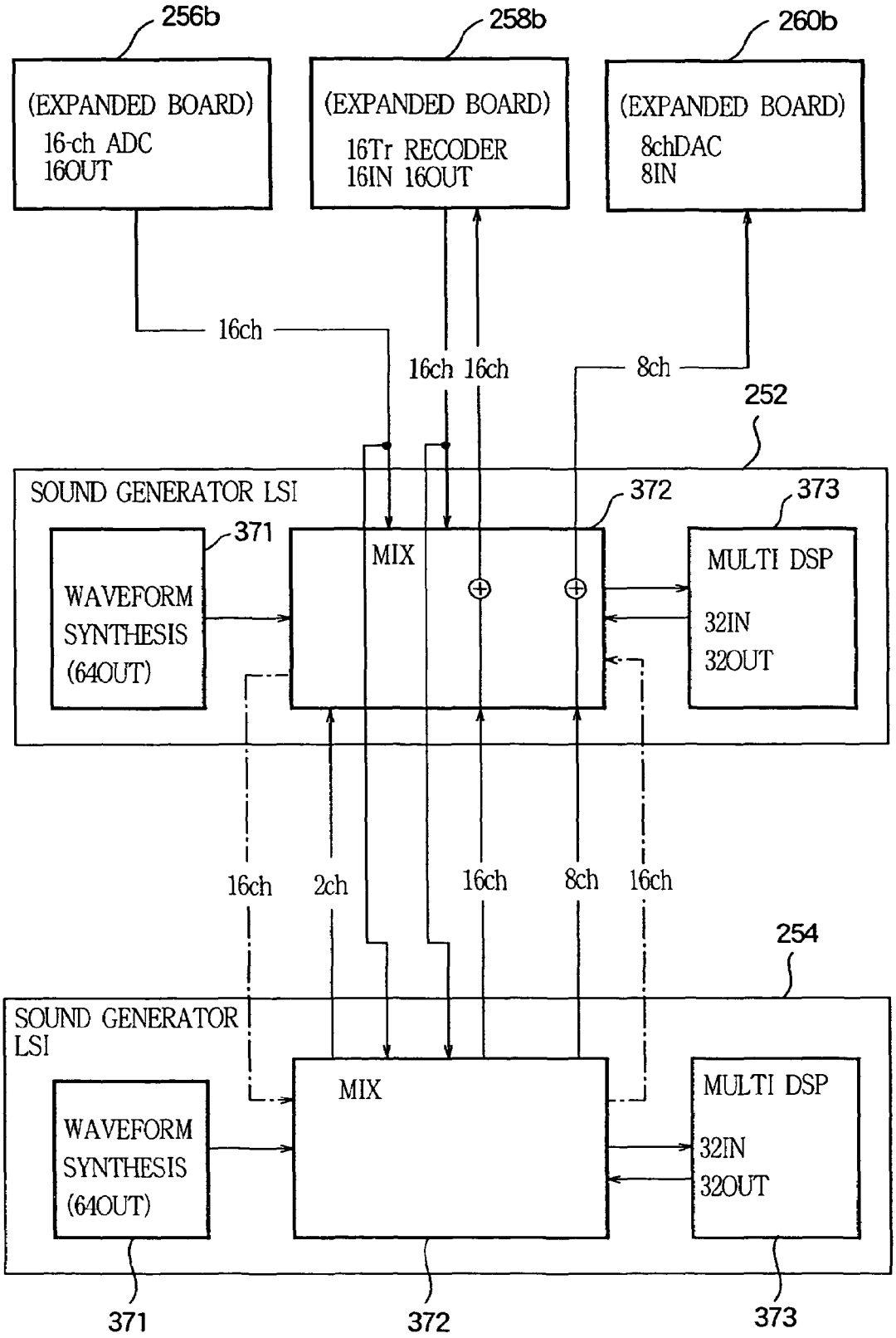
FIG. 15 is a block diagram showing a logical connection state when the sound generation unit 250 constitutes a multitrack recording apparatus.

The sound generation unit 250 in the present embodiment can also achieve functions totally different from the functions accomplished as a mere sound generation unit. As an example of this, FIG. 15 shows an example of logical connection which constitutes a multitrack recording apparatus with a sound generator using the sound generation unit 250. In the drawing, an AD converter 256b, multitrack recorder 258b and DA converter 260b are each inserted as the expanded boards 256, 258 and 260.

The AD converter 256b receives 16-channel analog signals from the external device, and converts them into 16-channel waveform data. The multitrack recorder 258b records/reproduces 16-channel audio signals, and the DA converter 260b converts each of supplied 8-channel waveform data into analog signals and outputs them to the external device.

In FIG. 15, as in FIG. 13, arrows connecting the components indicate logical connection states among the components, and dashed connection lines between the sound generator LSIs 252 and 254 pass through the direct connection line 253, and other connection lines pass through the A bus 262. In FIG. 15, the 16-channel waveform data output from the AD converter 256b are input to the sound generator LSIs 252, 254 respectively via the A bus 262.

Furthermore, from the sound generator LSI 254 to the sound generator LSI 252, 16-channel waveform data is supplied via the direct connection line 253, and 26-channel waveform data is supplied via the A bus 262. In the latter 26-channel waveform data, 2 channels are simply supplied to the sound generator LSI 252, but 16 channels provide the waveform data recorded by the multitrack recorder 258b, and 8 channels provide the waveform data output to the external via the DA converter 260b.

The 16-channel and 8-channel waveform data are mixed with other waveform data generated by the sound generator LSI 252, and the 16-channel and 8-channel waveform data resulted from the mixing are each supplied to the multitrack recorder 258b and the DA converter 260b. When the multitrack recorder 258b is in a recording state, the 16-channel waveform data supplied via the sound generator LSI 252 is recorded. When the multitrack recorder 258b is in a reproducing state, the reproduced results are output as the 16-channel waveform data to the sound generator LSIs 252, 254.

Figure 16:
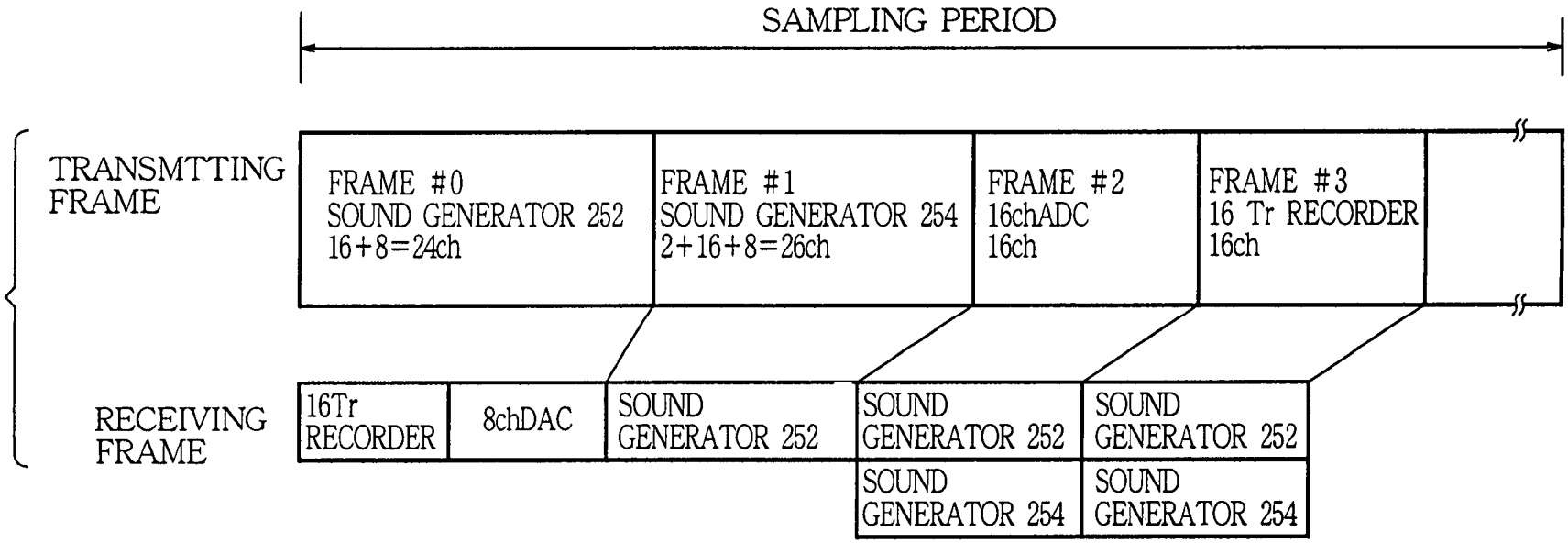
FIG. 16 is a diagram showing an example of frame assignment to realize the logical connection state of FIG. 15.

Furthermore, the DA converter 260b converts the 8-channel waveform data supplied via the sound generator LSI 252 into analog signals, and outputs them to the external device. Next, FIG. 16 shows an example of frame assignment to realize the aforementioned logical connection state. In the drawing, a frame #0 is assigned as a transmission frame of the sound generator LSI 252. The multitrack recorder 258b is provided with 16 channels and the DA converter 260b is provided with 8 channels for the waveform data output from the sound generator LSI 252 to other components via the A bus 262, so that a time equivalent to a total of 24 channels is assigned to the frame #0.

Furthermore, a frame #1 is assigned as a transmission frame of the sound generator LSI 254. Only 26-channel waveform data is output to the sound generator LSI 252 as the waveform data output to other components from the sound generator LSI 254 via the A bus 262, so that a time equivalent to 26 channels is assigned to the frame #1. Further, frames #2, #3 are assigned as transmission frames of the AD converter 256b and the multitrack recorder 258b, and lengths corresponding to the number of output channels of the waveform data are assigned to the frames #2, #3. In addition, the DA converter 260b functions only as a receiving node and does not output waveform data to the A bus 262, and thus is not assigned a transmission frame.

3. Operation in the Embodiment

Next, operations in the present embodiment will be described.

First, when the power source of the musical sound synthesizing apparatus in the present embodiment is turned on, contents in the parameter ROM 490 of each node are read by the CPU 212, thereby detecting a kind of each node and the like. Next, executable operation modes are listed on the display device 208 in accordance with the presently mounted nodes. The executable operation modes would be, for example, "general-purpose sound generator (FIG. 13)", "sound generator for electronic pianos", "sound generator for synthesizers", and "multitrack recording apparatus (FIG. 15)". When a user selects one of these operation modes, detailed parameters (e.g., the number of parts of the waveform data to be synthesized by the sound generator, detailed contents of the effects, mixing ratio of a plurality of channels) corresponding to the selected operation mode and the like can further be set.

When the above setting is finished, detailed operation contents of each node is decided. More specifically, the number of frames provided in one sampling period, a frame in which each node becomes the transmitting node and a frame in which each node becomes the receiving node are decided, and the offset value is further decided in the frame in which each node becomes the receiving node. Also, detailed timing relations among the frames are decided.

For example, when the waveform data should be transferred from a certain transmitting node to one or plurality of receiving nodes, a receiving and transmission rate is decided in accordance with the node that has the highest transmission rate or lowest receiving rate of all the transmission and receiving nodes. Further, the clock speed of the clock signal ACLK in each frame is decided depending on the amount of data to be transmitted and received and the bus width, and a length of each frame is decided. When all the parameters are decided in this way, these parameters are written into the control registers 470 of the nodes by the CPU 212. This enables the musical sound synthesizing apparatus to function in the desired operation mode.

Furthermore, if the user can freely edit the logical connection states among the nodes, a user's original operation mode can be made in addition to the operation modes listed when the power source is turned on. In that case, the CPU 212 automatically decides a transmission slot (transmission frame number and the number of units) in which each node carries out transmission in accordance with a set logical connection state, and/or a reception slot (reception frame and unit number) in which each node carries out reception, and the slots are set in the receiving control register 472 and transmission control register 476 of the nodes. Here, the CPU 212 sequentially assigns different transmission slot numbers to the nodes so that the same transmission slot is not set in different nodes. Moreover, a sum of the numbers of units in a plurality of transmission slots is checked whether or not it exceeds the transfer capability of the A bus 262 per sampling period, and if it exceeds, a warning can be given to the user.

Alternatively, the user may also be allowed to freely designate the transmission frame and/or the number of units in each node. In that case, the CPU 212 checks whether or not the same frame number is designated as a transmission frame in any two of the plurality of nodes, and if the same frame number is designated, a warning can be given to the user or one of the frame number can be automatically corrected. Moreover, when the number of transmission units in a plurality of nodes exceeds the transfer capability of the A bus 262, a warning of this fact can be given.

In this way, according to the present embodiment, the logical connection state can be freely set without changing a physical connection state in the sound generation unit 250. As a result, it is possible to enrich the variation of the functions or operation modes achieved by the sound generation unit 250, and to significantly expand its versatility.

4. Modifications

The present invention is not limited to the embodiments described above, and can be modified in various ways, for example, as follows:

(1) The operation mode of the musical sound synthesizing apparatus is determined by the selecting operation of the user in the embodiment determined above, but the operation mode can also be decided automatically. For example, when the musical sound synthesizing apparatus in the above embodiment is used as a part of a music instrument system such as an electronic piano, electronic organ or synthesizer, the CPU 212 detects the kind of system in which the musical sound synthesizing apparatus is installed, and automatically sets the operation mode of the musical sound synthesizing apparatus to fit the system.

(2) The data line bit number register 474 (see FIG. 9) stores the bit width of the data signal ADAT correspondingly to each address of the receiving control register 472 in the embodiment described above, but the bit width in each frame may be fixed to either "16 bits" or "4 bits", and thus the bit width may be stored with respect to each "frame".

(3) In the embodiment described above, the kind and the like of each node is detected when the power source of the musical sound synthesizing apparatus is turned on, and the operation mode corresponding to the kind of node is selected. However, the operation mode may be set regardless of the kind of node. Further, the user selects one operation mode from a plurality of operation modes, but it is not essential that the users should be able to select. For example, manufacturers may determine fixed operation modes for each model and set them in the musical sound synthesizing apparatus. Concretely, the ROM 214 stores a particular CPU program corresponding to the operation mode that is decided for the particular model, and the CPU 212 may set each node connected to the A bus 262 in accordance with the CPU program. Alternatively, the ROM 214 stores a plurality of CPU programs corresponding to the operation modes for a plurality of models, and one CPU program corresponding to the operation mode for the particular model may be selected by means of a jumper line, microswitch, pull-up or pull-down resistor on the sound board.

As described above, according to the first aspect of the present invention, each transmitting node transmits data signals to the bus per sampling period in predetermined order, and each receiving node selectively obtains a necessary signal from the data signals, so that it is possible to freely set a logical connection state from an optional transmitting node to an optional receiving node, thereby enabling high versatility with a simple circuit.

Furthermore, with a configuration in which a data signal is converted to a data signal synchronous with the operation clock of a transmitting node on the basis of the operation clock of the receiving node, for example, the waveform data can be transmitted and received without providing a buffer or the like that stores the waveform data of a plurality of samples, thereby making it possible to simplify the circuit configuration. Moreover, with a configuration in which a bit width n for each transmitting node can be set to different values for each transmitting node, the data line width can be reduced as needed to decrease costs.

As described above, according to the second aspect of the present invention, each transmitting node transmits a data signal to the bus in a detected transmission frame, and each receiving node receives the data signal from the bus in a detected reception frame, so that it is possible to freely set a logical connection state from an optional transmitting node to an optional receiving node, thereby enabling high versatility with a simple circuit.

As described above, according to the third aspect of the present invention, once a controller designates a transmission slot and reception slot for each transmitting node and the receiving node, data is then transferred between each transmitting node and the receiving node without the intervention of the controller, so that it is possible to freely set a logical connection state from an optional transmitting node to an optional receiving node, thereby enabling high versatility with a simple circuit.

What is claimed is:

1. A transmitting node device [connected] *operatively coupled* to a bus for transferring data during each of a plurality of time frames on a time divisional basis within one sampling period, the bus comprising a plurality of data signal lines and one frame signal line, said bus operatively coupled to at least one receiving node and to a plurality of other transmitting nodes of the same structure as the transmitting node device, wherein each of the transmitting nodes is assigned a unique frame number such that the frame numbers collectively compose a consecutive order, wherein each of the transmitting nodes [transmit] *transmits* one frame to the bus during different timing in a sequential manner and in accordance with the respective [frames] *frame numbers* assigned, wherein only one transmitting node transmits a frame during a given period of time, and wherein said receiving node is designated one of said plurality of frame numbers and selectively acquires, in accordance with the designated frame number, data in a frame transmitted by a transmitting node during the frame that corresponds to the designated frame number, the transmitting node device comprising:

a frame counter that counts [a number of the] frames *in each sampling period to generate a current frame number* on the basis of a frame signal transferred by the frame signal line within the sampling period;

a first register that stores the unique frame number, assigned to the transmitting node device, designating a transmission frame by which the transmitting node device should transmit data;

a second register that stores the data to be transmitted via the bus during the transmission frame;

a comparator that outputs a coincidence signal when detecting that the *current frame* number [of the frames counted] *generated* by the frame counter coincides with the frame number stored in the first register; and a transmitting section that forms a frame signal corresponding to the transmission frame and transmits the formed frame signal to the frame signal line of the bus in response to the coincidence signal, and concurrently transmits the data stored in the second register to the data signal lines by the transmission frame.

2. The transmitting node device according to claim 1, wherein each of the plurality of transmitting nodes include a register of the same structure as said first register of the transmitting node device, and is connected with a controller for controlling the plurality of the transmitting nodes, wherein the controller assigns unique frame numbers to each of said plurality of transmitting nodes, and sets, to the register of each of transmitting nodes, the assigned unique frame number.

3. The transmitting node device according to claim 1, wherein the second register stores audio waveform data of a plurality of audio channels, and the transmitting section sequentially outputs the audio waveform data of the plurality of the audio channels to the data signal lines during the transmission frame.

4. A method of operating a transmitting node device connected to a bus for transferring data during each of a plurality of time frames on a time divisional basis within one sampling period, the bus comprising a plurality of data signal lines and one frame signal line, said bus operatively coupled to at least one receiving node and to a plurality of other transmitting nodes of the same structure as the transmitting node device, wherein each of the transmitting nodes is assigned a unique frame number such that the frame numbers collectively compose a consecutive order, wherein each of the transmitting nodes [transmit] *transmits* one frame to the bus during different timing in a sequential manner and in accordance with the respective [frames] *frame numbers* assigned, wherein only one transmitting node transmits a frame during a given period of time, and wherein said receiving node is designated one of said plurality of frame numbers and selectively acquires, in accordance with the designated frame number, data in a frame transmitted by a transmitting node during the frame that corresponds to the designated frame number, the method of operating the transmitting node device comprising the steps of:

counting [a number of the] frames *in each sampling period to generate a current frame number* on the basis of a frame signal transferred by the frame signal line within the sampling period;

storing the unique frame number, assigned to the transmitting node device, designating a transmission frame by which the transmitting node device should transmit data;

storing the data to be transmitted via the bus during the transmission frame;

outputting a coincidence signal when detecting that the [counted] *current frame* number [of the frames] coincides with the stored frame number;

forming a frame signal corresponding to the transmission frame;

transmitting the formed frame signal to the frame signal line of the bus in response to the coincidence signal; and concurrently transmitting the stored data to the data signal lines by the transmission frame.

5. A receiving node device operatively coupled to a bus, the bus comprising a plurality of data signal lines and one frame signal line for transferring data by a plurality of time frames on a time divisional basis within one sampling period, said bus operatively coupled to a plurality of transmitting nodes, wherein each of the transmitting nodes is assigned a unique frame number such that the frame numbers collectively compose a consecutive order, wherein each of the transmitting nodes [transmit] *transmits* one frame to the bus during different timing in a sequential manner and in accordance with the respective [frames] *frame numbers* assigned, wherein only one transmitting node transmits a frame during a given period of time, and wherein said receiving node device is designated one of said plurality of frame numbers and selectively acquires, in accordance with the designated frame number, data in a frame transmitted by a transmitting node during the frame that corresponds to the designated frame number, the receiving node device comprising:

a frame counter that counts [frame numbers] *frames in each sampling period to generate a current frame number* on the basis of a frame signal transferred from the frame signal line within the sampling period;

a first register that stores the designated frame number indicating a reception frame by which the receiving node device should receive data;

a second register that is prepared for storing data;

a comparator that outputs a coincidence signal when detecting that the *current* frame number [counted] *generated* by the frame counter coincides with the designated frame number stored in the first register; and a receiving section that selectively acquires the data carried by the reception frame through the data signal lines into the second register in response to the coincidence signal.

6. The receiving node device according to claim 5, wherein the frame transmitted by one of transmitting nodes and received by the receiving node device contains a plurality of data corresponding to a plurality of channels, wherein the receiving node device further [comprising] *comprises* a data counter that counts [a number of] data in the reception frame that the receiving node device is concurrently receiving via the bus *to generate a data number*, wherein the first register stores an offset value indicative of an order of data to be acquired in the reception frame besides the designated frame number, wherein the comparator outputs the coincidence signal upon detecting that the *current* frame number [counted] *generated* by the frame counter and the *data* number [of data counted] *generated* by the data counter coincide with the designated frame number and the offset value stored in the first register, and wherein the receiving section selectively acquires the data among the plurality of data in the reception frame in response to the coincidence signal.

7. A method of operating a receiving node device operatively coupled to a bus, said bus comprising a plurality of data signal lines and one frame signal line for transferring data by a plurality of time frames on a time divisional basis within one sampling period, said bus operatively coupled to a plurality of transmitting nodes, wherein each of the transmitting nodes is assigned a unique frame number such that the frame numbers collectively compose a consecutive order, wherein each of the transmitting nodes [transmit] *transmits* one frame to the bus during different timing in a sequential manner and in accordance with the respective [frames] *frame numbers* assigned, wherein only one transmitting node transmits a frame during a given period of time, and wherein said receiving node device is designated one of said plurality of frame numbers and selectively acquires, in accordance with the designated frame number, data in a frame transmitted by a transmitting node during the frame that corresponds to the designated frame number, said method comprising the steps of:

counting [frame numbers] *frames in each sampling period to generate a current frame number* on the basis of a frame signal transferred from the frame signal line within the sampling period;

storing the designated frame number indicating a reception frame by which the receiving node device should receive data;

preparing a register for storing data;

outputting a coincidence signal when detecting that the [counted] *current* frame number coincides with the designated frame number stored by said storing step; and selectively acquiring data carried by the reception frame through the data signal lines into the register in response to the coincidence signal.

*8. A receiving node device operatively coupled to a bus, the bus comprising a plurality of data signal lines and one frame signal line for transferring data by plurality of time frames on a time divisional basis within one sampling period, said bus operatively coupled to a plurality of transmitting nodes, wherein each of the transmitting nodes is assigned a unique frame number such that the frame numbers collectively compose a consecutive order, wherein each of the transmitting nodes transmits one frame to the bus during different timing in a sequential manner and in accordance with the respective frame numbers assigned, wherein only one transmitting node transmits a frame during a given period of time, and wherein said receiving node device is designated one of said plurality of frame numbers and selectively acquires, in accordance with the designated frame number, data in a frame transmitted by a transmitting node during the frame that corresponds to the designated frame number,*

*the receiving node device comprising:*

*a frame counter that counts frames in each sampling period to generate a current frame number on the basis of a frame signal transferred by the frame signal line within the sampling period;*

*a data counter that counts data in the reception frame that the receiving node device is concurrently receiving via the bus to generate a data number;*

*a first register that stores the designated frame number indicating the reception frame by which the receiving node device should receive data and an offset value indicative of an order of data to be acquired in the reception frame;*

*a second register that is prepared for storing data;*

*a comparator that outputs a coincidence signal when detecting that the current frame number generated by the frame counter and the data number generated by the data counter coincides with the designated frame number and the offset value stored in the first register; and*

*a receiving section that selectively acquires the data among the plurality of data in the reception frame through the data signal lines into the second register in response to the coincidence signal.*

* * * * *